United States Patent
Ma

(10) Patent No.: US 10,037,384 B2
(45) Date of Patent: Jul. 31, 2018

(54) METHOD AND APPARATUS FOR NOTIFYING A USER OF UPDATED CONTENT FOR A WEBPAGE

(71) Applicant: Tencent Technology (Shenzhen) Company Limited, Shenzhen (CN)

(72) Inventor: Yongfei Ma, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 623 days.

(21) Appl. No.: 14/315,245

(22) Filed: Jun. 25, 2014

(65) Prior Publication Data

US 2014/0359490 A1    Dec. 4, 2014

Related U.S. Application Data

(63) Continuation of application No. PCT/CN2014/070571, filed on Jan. 14, 2014.

(30) Foreign Application Priority Data

May 28, 2013  (CN) .......................... 2013 1 0203808

(51) Int. Cl.
  *G06F 3/00*    (2006.01)
  *G06F 17/30*   (2006.01)
  *H04M 1/725*   (2006.01)

(52) U.S. Cl.
  CPC ... *G06F 17/30867* (2013.01); *H04M 1/72561* (2013.01)

(58) Field of Classification Search
  None
  See application file for complete search history.

(56) References Cited

U.S. PATENT DOCUMENTS

| | | | | |
|---|---|---|---|---|
| 2002/0120648 A1* | 8/2002 | Ball | ................. | G06F 17/30899 715/234 |
| 2006/0277481 A1* | 12/2006 | Forstall | ............. | G06F 17/30899 715/764 |
| 2012/0066380 A1* | 3/2012 | Gao | ..................... | G06F 17/3089 709/224 |

FOREIGN PATENT DOCUMENTS

| | | |
|---|---|---|
| CN | 1783804 A | 6/2006 |
| CN | 1845134 A | 10/2006 |
| CN | 101783907 A | 7/2010 |

(Continued)

OTHER PUBLICATIONS

Tencent Technology, ISRWO, PCT/CN2014/070571, dated Apr. 23, 2014, 7 pgs.

(Continued)

*Primary Examiner* — Thanh Vu
(74) *Attorney, Agent, or Firm* — Morgan, Lewis & Bockius LLP

(57) ABSTRACT

An electronic device with one or more processors and memory receives a user input corresponding to a request to monitor a webpage. The electronic device obtains, in accordance with a predetermined monitoring frequency, current summary information corresponding to the webpage. The electronic device determines whether the webpage includes updated content based on the summary information corresponding to the webpage. In accordance with a determination that the webpage includes updated content, the electronic device presents an indication of the updated content.

20 Claims, 22 Drawing Sheets

(56) References Cited

FOREIGN PATENT DOCUMENTS

| | | |
|---|---|---|
| CN | 101882162 A | 11/2010 |
| CN | 101937335 A | 1/2011 |
| CN | 102387174 A | 3/2012 |
| CN | 103023941 A | 4/2013 |

OTHER PUBLICATIONS

Tencent Technology, IPRP, PCT/CN2014/070571, dated Dec. 1, 2015, 5 pgs.

* cited by examiner

METHOD AND APPARATUS FOR NOTIFYING A USER OF UPDATED CONTENT FOR A WEBPAGE

RELATED APPLICATIONS

This application is a continuation application of PCT Patent Application No. PCT/CN2014/070571, entitled "METHOD AND APPARATUS FOR NOTIFYING A USER OF UPDATED CONTENT FOR A WEBPAGE" filed Jan. 14, 2014, which claims priority to Chinese Patent Application Serial No. 201310203808.5, entitled "METHOD AND APPARATUS FOR DISPLAYING UPDATED CONTENT FOR A WEBPAGE", filed May 28, 2013, the entirety of both of which is incorporated herein by reference.

FIELD OF THE INVENTION

The present invention relates to the field of Internet technologies, and more particularly to a method and device for notifying a user of updated content for a webpage.

BACKGROUND OF THE INVENTION

With the development of high speed communications networks (e.g., 3G and 4G LTE) and wireless network technologies (e.g., WiFi), mobile electronic devices are easily able to view content from news or social media networks via a web browser. For access to news or social media content, users may always be interested in some webpages or only concerned about webpages with updated content.

To keep abreast of updated content for a particular webpage (or website), current practice includes adding the webpage to a favorites list or adding a quick link to the page on the desktop. The aforementioned manners improve access efficiency to some extent, as compared with entering the webpage's URL (Uniform Resource Locator) into the web browser or by means of search. However, only after the user enters (e.g., loads) the entire webpage is it determined whether a webpage includes updated content. Thus, whether the webpage is updated cannot be timely displayed, and frequent use of the web browser to view the webpage consumes more power and data bandwidth. For mobile electronic devices with limited battery life, such as smart phones and tablet computers, frequent webpage views shorten battery life and increase network access costs.

SUMMARY

In order to address the problems in the prior art, the embodiments of the present invention provide a method and device for notifying a user of updated content for a webpage. In some embodiments, the method is performed at one or more electronic devices each with one or more processors and memory (e.g., client device 200, FIGS. 2A-2Q and 4-5 and/or server system 404, FIGS. 4 and 6). The method includes: receiving a user input corresponding to a request to monitor the webpage; and obtaining, in accordance with a predetermined monitoring frequency, current summary information corresponding to the webpage. The method also includes: determining whether the webpage includes updated content based on the summary information corresponding to the webpage; and in accordance with a determination that the webpage includes updated content, presenting an indication of the updated content. The summary information differs from the entire webpage in that it only needs to include sufficient data (less than the entire webpage) to determine whether there is any update to the webpage content, and thus, requires less power and/or network data bandwidth to download and process. In some embodiments, the summary information is downloaded from a server which generates the summary information from analyzing the webpage. In some embodiments, the summary information is generated locally on a user device, where the user device generates the summary information by selectively downloading and analyzing only a small portion of the webpage.

In some embodiments, an electronic device (e.g., client device 200, FIGS. 2A-2Q and 4-5 or server system 404, FIGS. 4 and 6) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device (e.g., client device 200, FIGS. 2A-2Q and 4-5 or server system 404, FIGS. 4 and 6) with one or more processors, cause the electronic device to perform the operations of the methods described herein.

Various advantages of the present invention are apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present invention comprehensible, the present invention is further described in detail below with reference to embodiments and the accompanying drawings. It should be understood that, the specific embodiments herein are only used to interpret the present invention, but not intended to limit the present invention.

Figure 1:
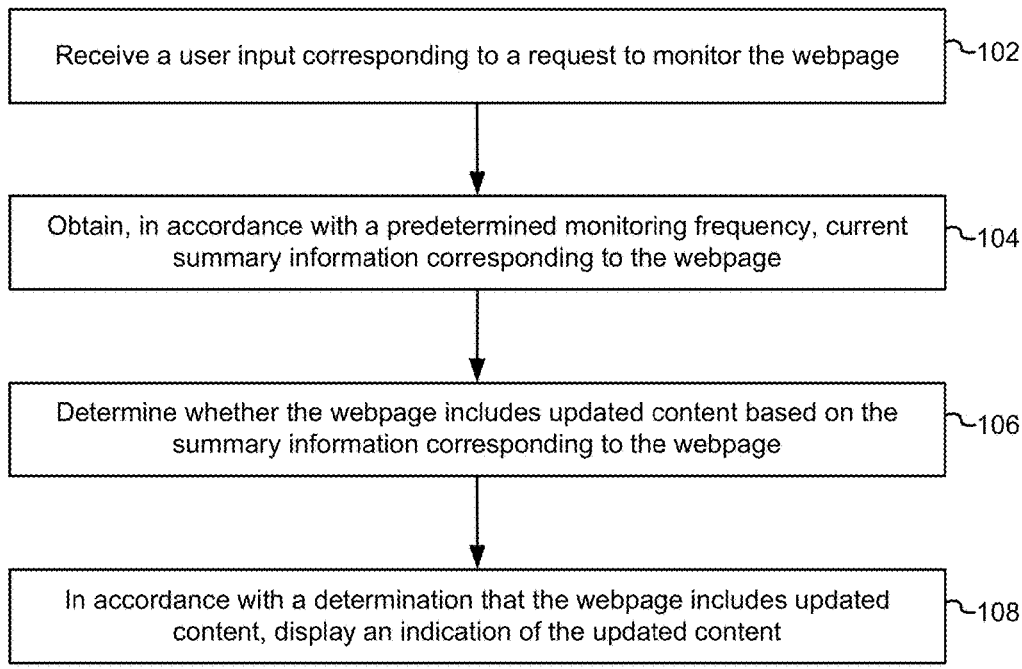
FIG. 1 is a flowchart diagram of a method of notifying a user of updated content for a webpage in accordance with some embodiments.

FIG. 1 is a flowchart diagram of a method 100 of notifying a user of updated content for a webpage in accordance with some embodiments. In some embodiments, method 100 is performed by one or more electronic devices each with one or more processors and memory. For example, in some embodiments, method 100 is performed by a user device (e.g., client device 200, FIGS. 2A-2Q and 4-5) or a component thereof (e.g., client-side module 300, FIGS. 3-5). In another example, method 100 is performed by a server system (e.g., server system 404, FIGS. 4 and 6) or a component thereof (e.g., server-side module 406, FIGS. 4 and 6). In a further example, method 100 is performed by a combination thereof the client device and the server system. In some embodiments, method 100 is governed by instructions that are stored in a non-transitory computer readable storage medium and the instructions are executed by one or more processors of the electronic device.

In some embodiments, a widget or a portion thereof (e.g., client-side module 300, FIGS. 3-5) is executed at a client device (e.g., client device 200, FIGS. 2A-2Q and 4-5). A widget is a small application that is created using existing Web technology for development similar to ordinary webpages. For example, the widget uses one or more of the following: HTML (Hyper Text Mark-up Language), CSS (Cascading Style Sheet), JavaScript (a client script language), XML (Extensible Mark-up Language), and AJAX (Asynchronous Java Script and XML). The most significant difference between a widget and an ordinary webpage is that the widget does not rely on a web browser (e.g., Mozilla, Internet Explorer, Opera, etc.) to display content. Furthermore, a widget is designed to have specific functions such as displaying stocks, weather forecasts, clock, and games. Thus, the user can enjoy services, such as news and weather updates, by viewing the corresponding widgets executed on the user device.

Figure 2A:
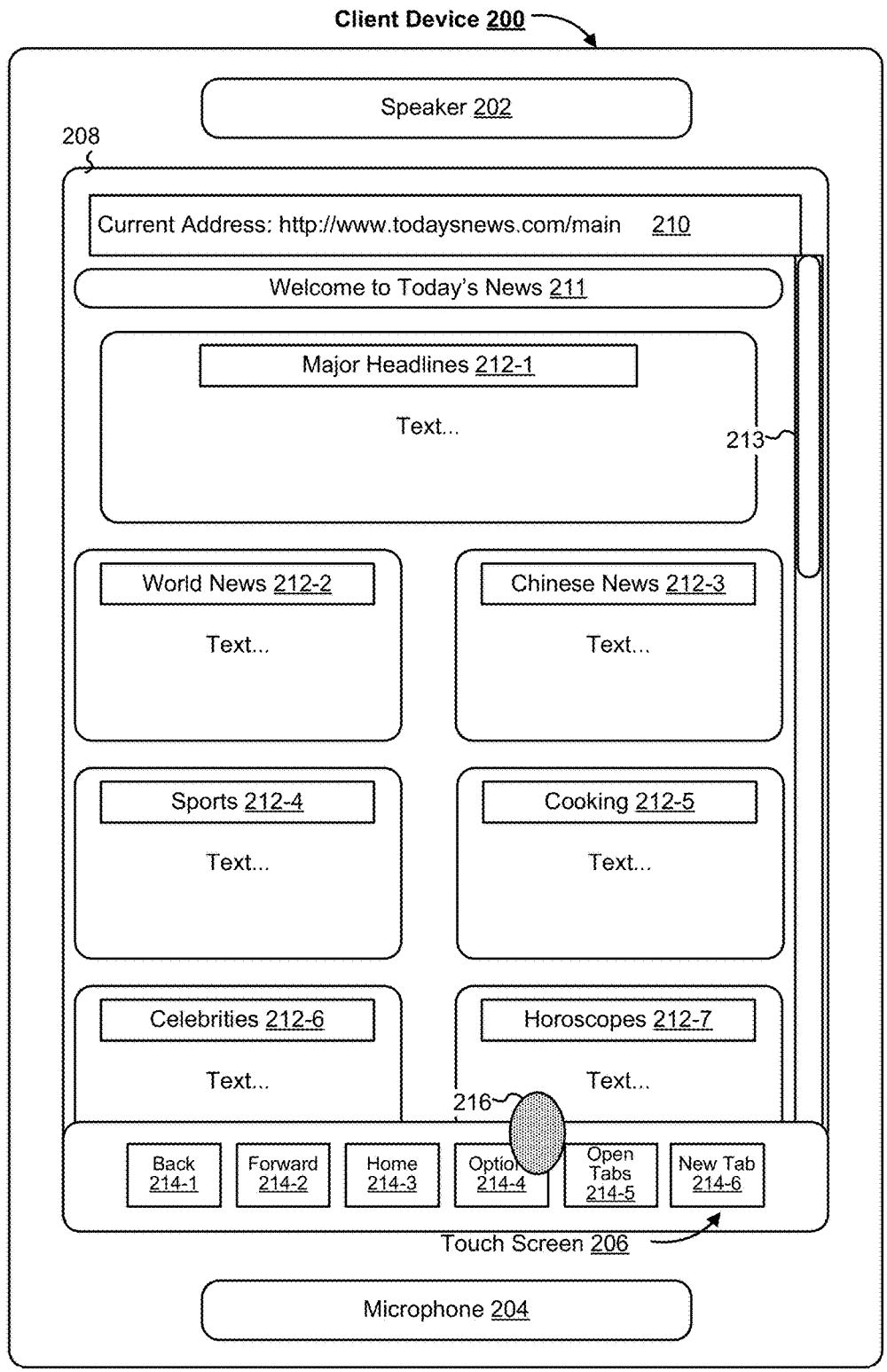
FIGS. 2A-2Q are user interfaces illustrating a method of notifying a user of updated content for a webpage in accordance with some embodiments.
Figure 2B:
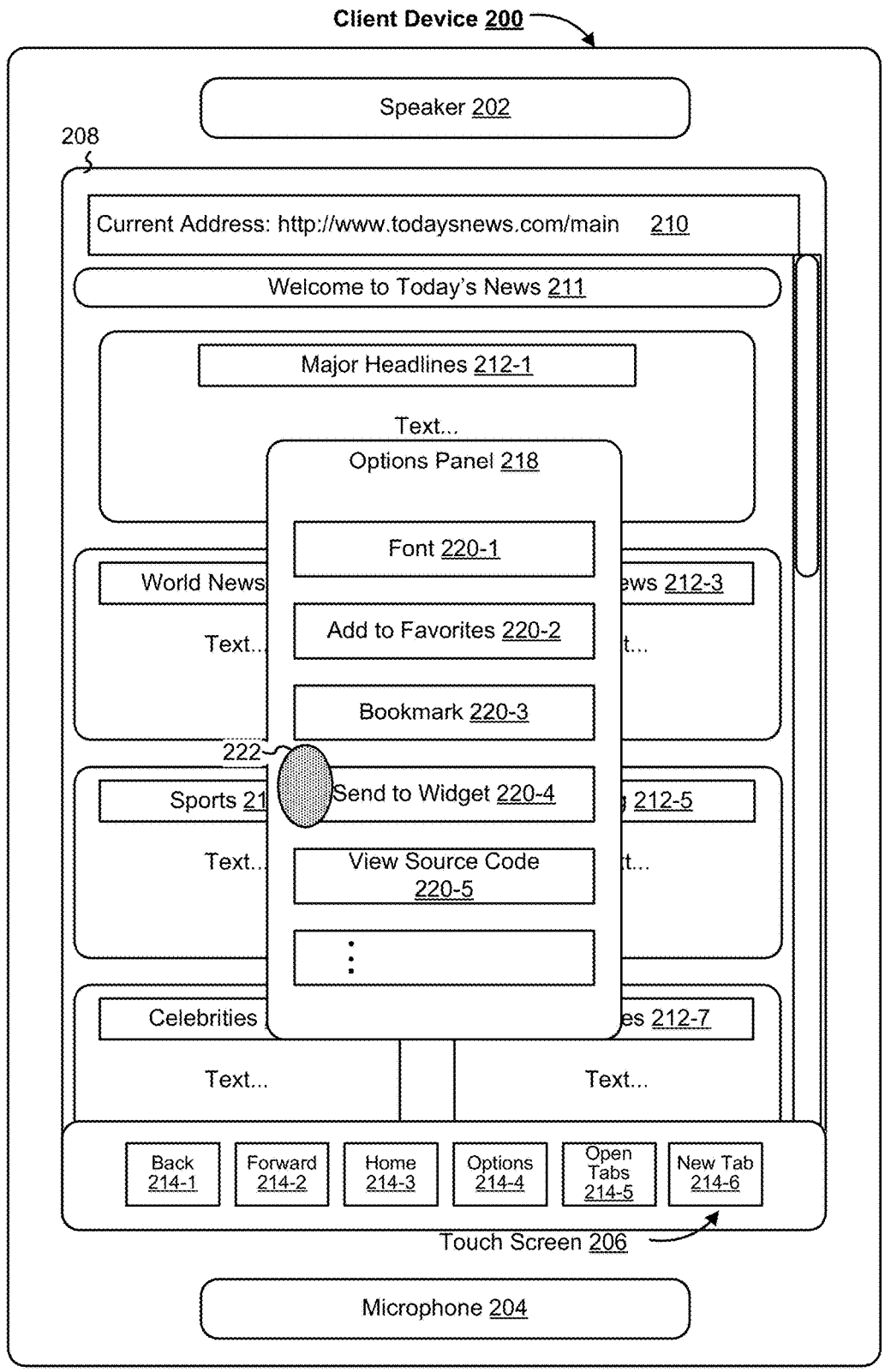
Figure 2C:
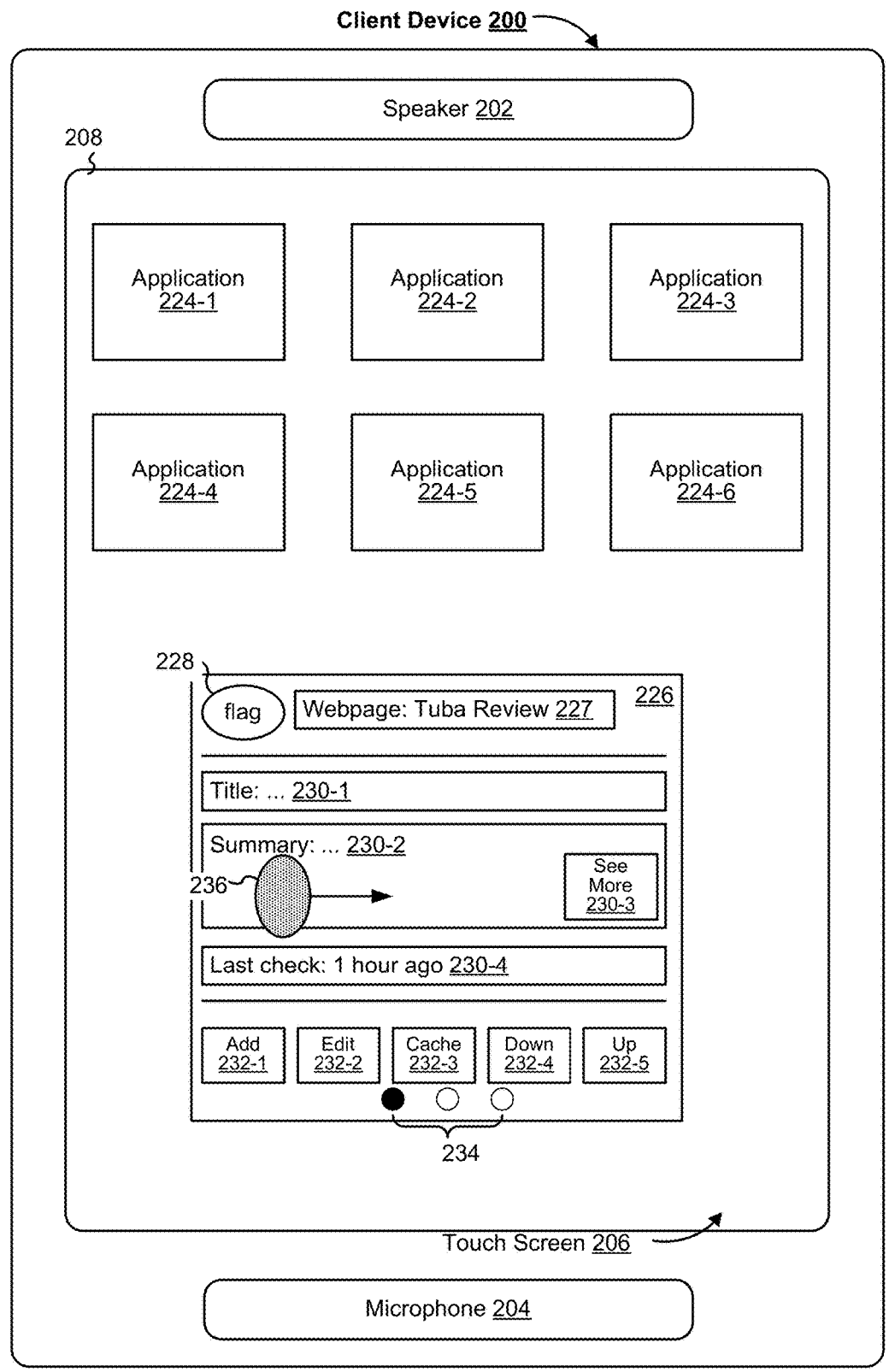
Figure 2D:
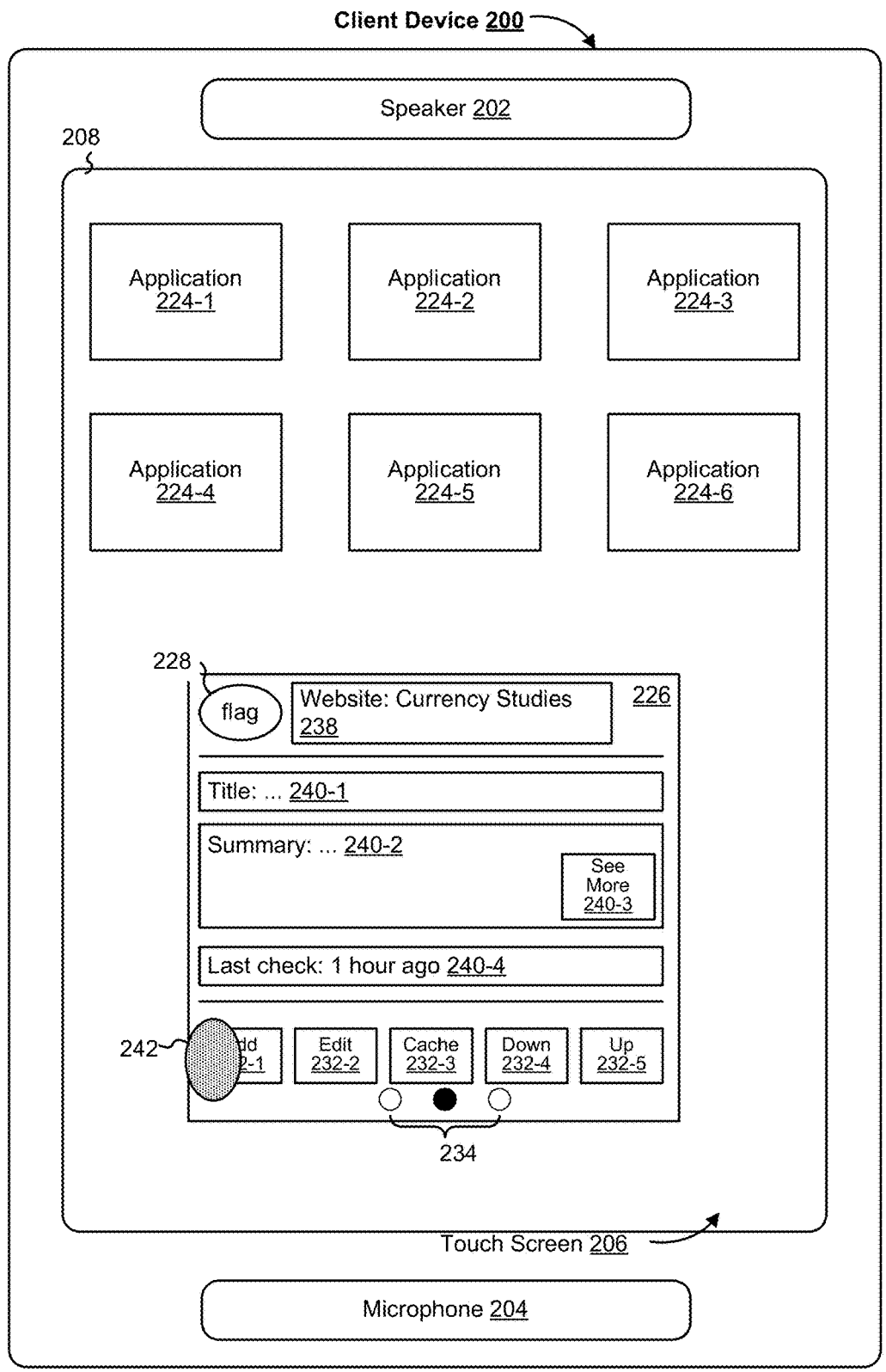
Figure 2E:
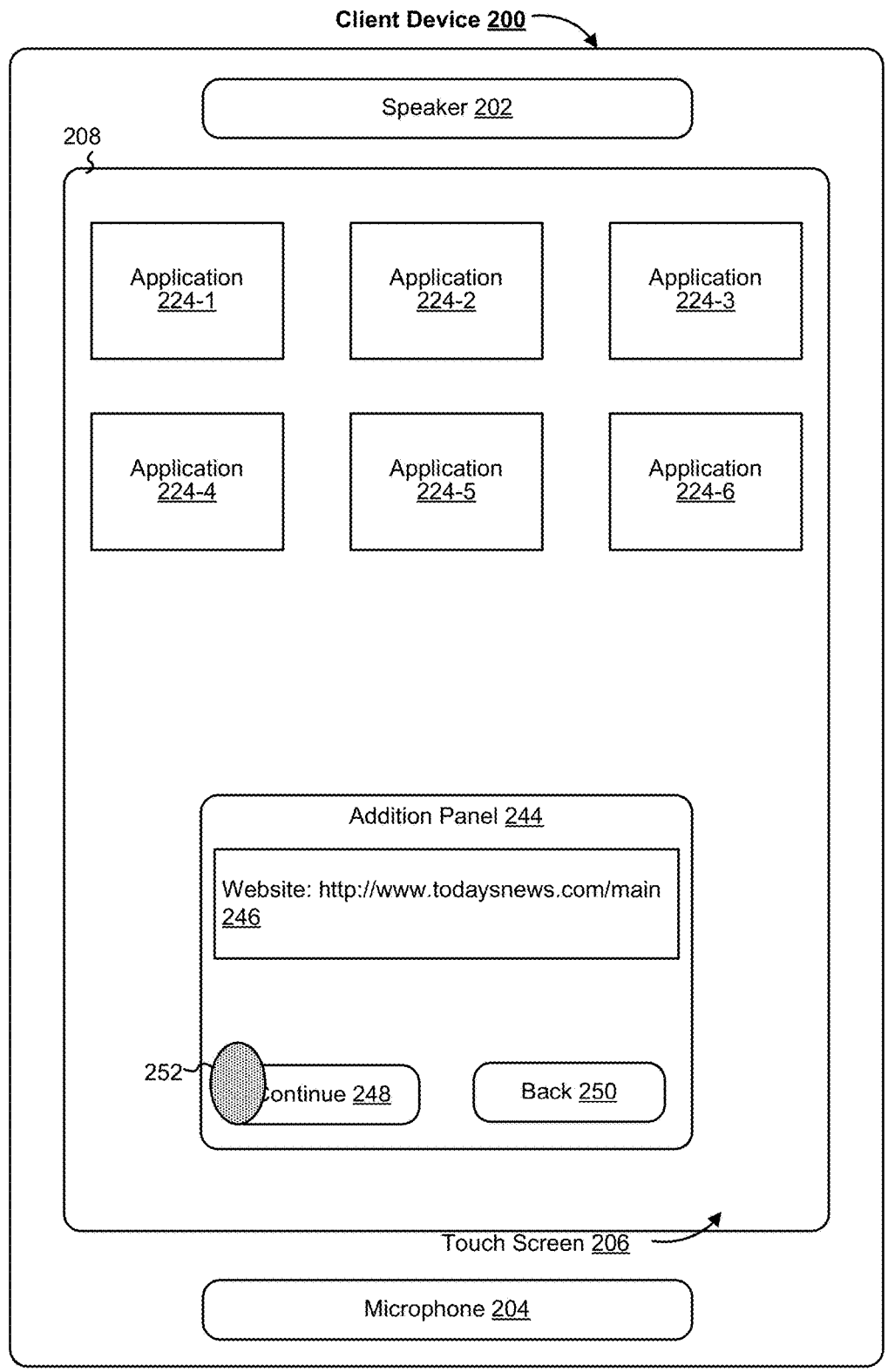

In some embodiments, the electronic device receives (102) a user input corresponding to a request to monitor the webpage. In some embodiments, a widget on the client device monitors the webpage. In one example, the user enters a URL (Uniform Resource Locator) for the webpage to be monitored in the widget (e.g., widget 226), as shown in FIGS. 2D-2E). In another example, the user selects an affordance (e.g., affordance 220-4 in FIG. 2B) within a web browser to monitor the displayed webpage, e.g., as shown in FIGS. 2A-2B. In a further example, the user selects one of a plurality of webpages suggested by the widget (e.g., suggested based on popularity in a community of users, the user's likes, or popularity amongst the user's friends) for monitoring.

In some embodiments, the electronic device obtains (104), in accordance with a predetermined monitoring frequency, current summary information corresponding to the webpage. In some embodiments, the summary information corresponds to the webpage or one or more of a plurality of portions of the webpage (e.g., one or more sub-blocks of the webpage) associated with a URL. In some embodiments, the summary information includes a timestamp corresponding to the webpage's last update, a brief summarization of the content (or a first few lines of content) of the webpage or portion(s) thereof, and a title or headline for the webpage or portion(s) thereof (e.g., the webpage's header, or the header of each sub-block that are being monitored). In some embodiments, the electronic device obtains the summary information according to predetermined monitoring frequency (e.g., every 15, 30, 60, etc. minutes). In some embodiments, the user of the electronic device is enabled to adjust the monitoring frequency associated with the webpage and/or one or more of a plurality of portions of the webpage. This avoids frequent downloading and opening the entire webpage, which consumes power and data bandwidth.

In some embodiments, the electronic device generates the summary information for the webpage by downloading and analyzing only a portion of the webpage (as opposed to the whole webpage). For example, the client device downloads a portion of the source code for the webpage and generates the summary information based on the downloaded source code. In some embodiments, the client device stops downloading the remainder of the source code as soon as enough information has been downloaded to generate the summary information for determining whether the content of the webpage has been updated. In some embodiments, a client device generates the summary information by analyzing the source code (also sometimes herein called webpage data) of the webpage (e.g., the text and/or structure of the HTML source code and associated CSS), without downloading all of the content of the webpage (e.g., embedded images, objects, scripts, etc.). In some embodiments, a server system generates the summary information and the client device requests and receives the summary information according to a predetermined monitoring frequency.

Figure 2F:
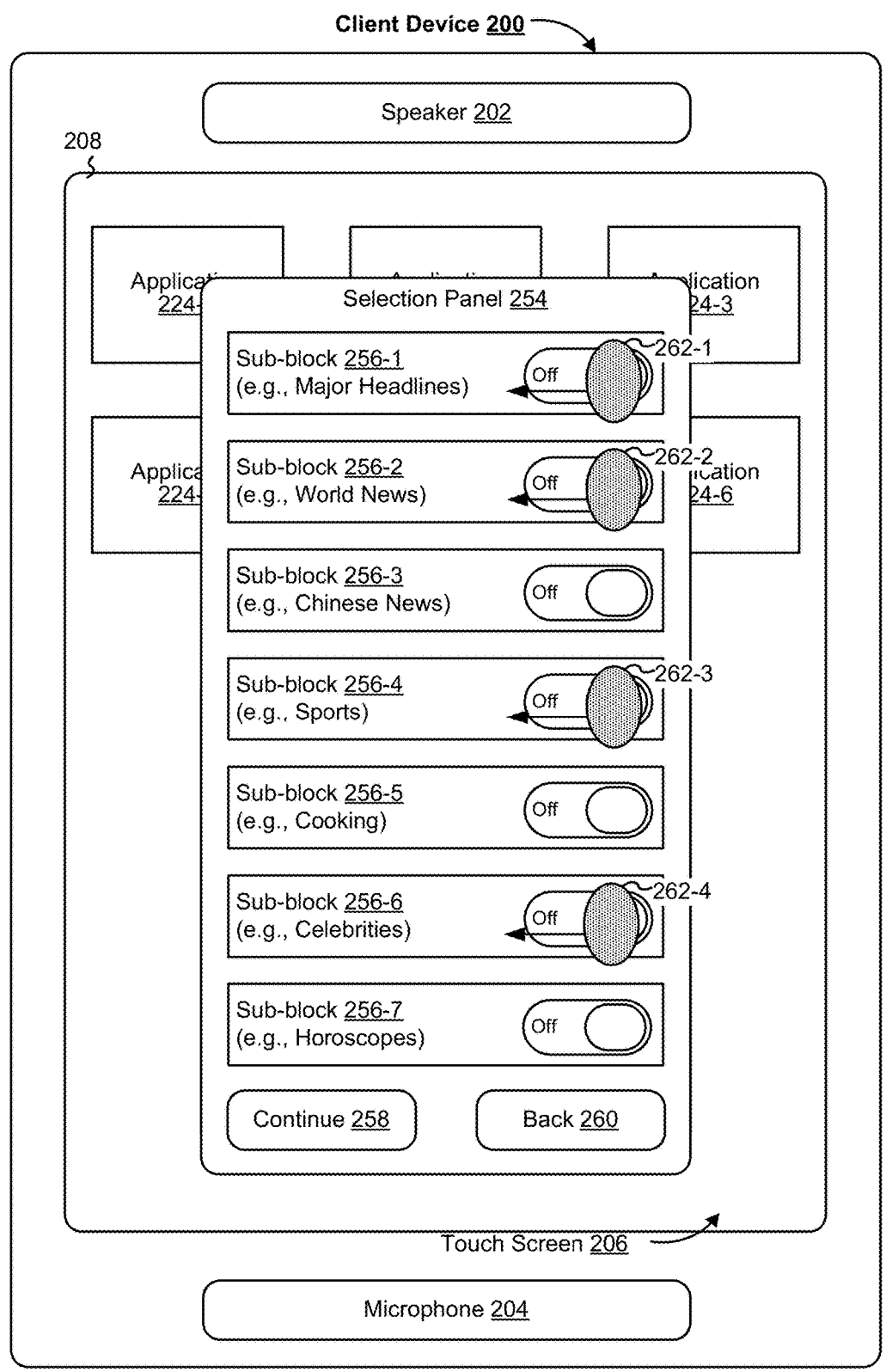

In some embodiments, in response to receiving the user input corresponding to the request to monitor the webpage, the electronic device: identifies a plurality of structurally discrete portions (e.g., sub-blocks) in the webpage by analyzing the webpage; and presents in the widget a respective selection affordance for individually monitoring each of the plurality of structurally discrete portions of the webpage. In some embodiments, after receiving the first user input, the server or the client device breaks the webpage down into its component portions. For example, the sub-blocks of webpage 211 (e.g., corresponding to the URL: http://www.todaysnews.com/main) displayed in FIG. 2A include: Major Headlines 212-1, World News 212-2, Chinese News 212-3, Sports 212-4, Cooking 212-5, Celebrities 212-6, and Horoscope 212-7. In FIG. 2F, for example, widget 226 includes selection panel 254 with a plurality of on/off affordances that enable the user of client device 200 to select particular sub-blocks of webpage 211 to monitor. In FIG. 2F, for example, selection panel 254 is in a first state where the plurality of on/off affordances are all in the "off" position. The user can individually turn on the monitoring for each of the sub-blocks by switching the corresponding on/off affordance of the sub-block to the "on" position.

Figure 2G:
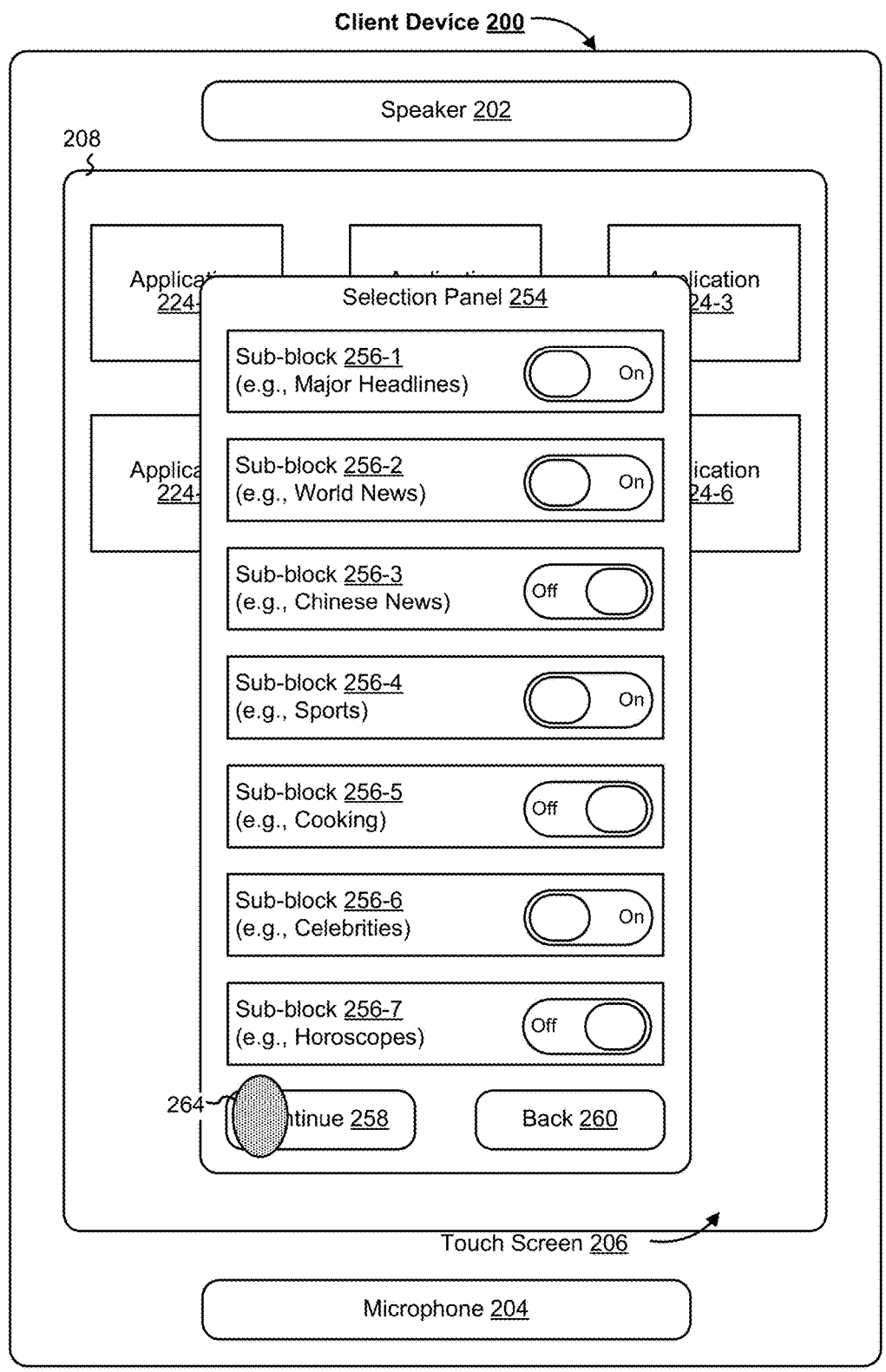

In some embodiments, the electronic device: receives a second user input corresponding to a request to monitor a respective portion of the plurality of portions of the webpage via the respective selection affordance of the respective portion; and in accordance with the second user input, starts individual monitoring of the a respective portion of the webpage. In FIG. 2F, for example, client device 200 detects a plurality of swipe gestures at locations corresponding to the on/off affordance associated with sub-blocks 256-1, 256-2, 256-4, and 256-6. In FIG. 2G, for example, on/off affordances associated with sub-blocks 256-1, 256-2, 256-4, and 256-6 are in the "on" position. For example, according to the configuration of the on/off affordances in FIG. 2G, widget 226 will only monitor Major Headlines 256-1, World News 256-2, Sports 256-4, and Horoscopes 256-6 sub-blocks of the webpage located at URL http://www.todaysnews.com/main.

Figure 2H:
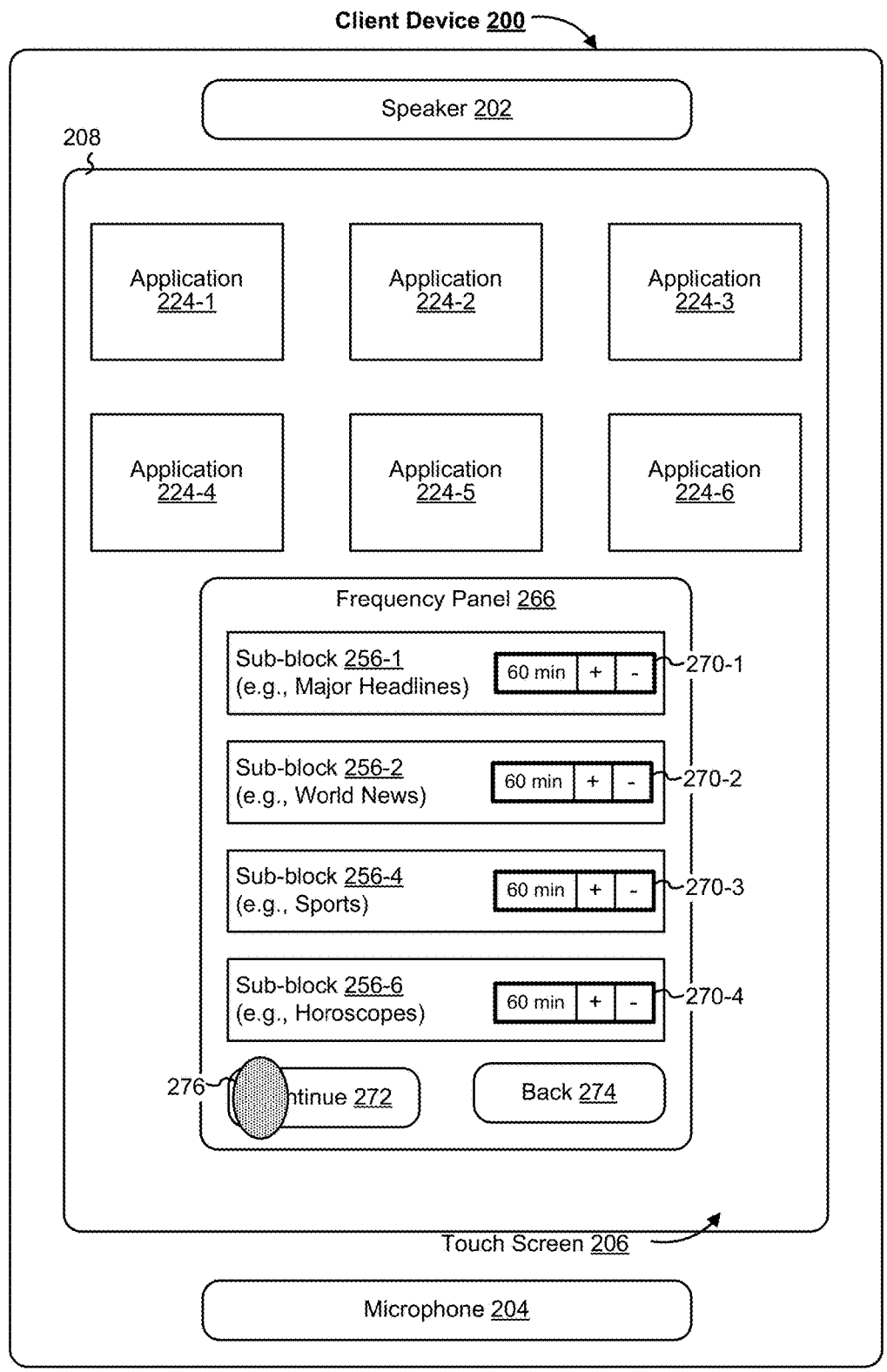

In some embodiments, the electronic device: receives a second user input selecting the respective selection affordances of at least two of the plurality of discrete portions of the webpage; and presents a respective frequency affordance for each of the at least two discrete portions for independently setting a respective monitoring frequency for the discrete portion. In FIG. 2F, for example, client device 200 detecting a plurality of swipe gestures at locations corresponding to the on/off affordance associated with sub-blocks 256-1, 256-2, 256-4, and 256-6. In FIG. 2H, for example, frequency panel 266 includes monitoring frequency adjustment user interface elements 270 for sub-blocks 256-1, 256-2, 256-4, and 256-6 (e.g., the sub-blocks selected in FIGS. 2F-2G). In FIG. 2H, for example, respective monitoring frequency adjustment user interface elements 270-1 includes the current monitoring frequency for sub-block 256-1 (e.g., 60 minutes) and +/−affordances for increasing or decreasing, respectively, the monitoring frequency for sub-block 256-1. Using these monitoring frequency adjustment user interface elements, the user can establish different monitoring frequencies for different sub-blocks of the same webpage, such that the established monitoring frequencies match well with the user's differing levels of interest in the different content blocks, and the respective usual update frequencies of the different content blocks.

In some embodiments, the electronic device determines (106) whether the webpage includes updated content based on the summary information corresponding to the webpage. In some embodiments, the electronic device compares the current summary information with previously obtained summary information for the webpage. In some embodiments, the determination is made on a per portion basis. In some embodiments, page names (e.g., subtitles or headlines), update timestamps, or text keywords are compared to make the determination.

In some embodiments, the type of previously obtained summary information of the webpage and the current summary information obtained in step 104 are of the same kind, which may include one or more of the page name, update date, caption for image, and text keyword, page size, number of sub-blocks in the page, etc. The electronic device compares the current summary information with previously obtained summary information of the webpage in a manner of individual comparison or comparison of multiple combinations.

For example, the current page name is compared with the previously obtained page name, to judge whether the two names are the same. If the names are identical, the electronic device determines that the webpage does not include updated content. In another example, the current update date is compared with the previously obtained update date of the webpage. If the previously obtained update date is the latest update date, the electronic device determines that the webpage does not include updated content. In some embodiments, the comparison threshold may be set for comparison of text keywords, and when the number of same text keywords reaches the number of the comparison threshold, it can be considered that the webpage does not include updated content. In some embodiments, to enhance comparison precision, when all text keywords are the same, the webpage does not include updated content. In some embodiments, the above three comparison manners can use a combination manner, so as to improve accuracy of comparison and judgment on the page content.

In some embodiments, the electronic device displays (108) an indication of the updated content in accordance with a determination that the webpage includes updated content. If the webpage includes updated content, the widget displays an update indicator to notify the user of the updated content. In some embodiments, when the webpage is updated multiple times, statistics are made available on the number of updated content items, and the update indicator displays the number of updated content items.

Figure 2I:
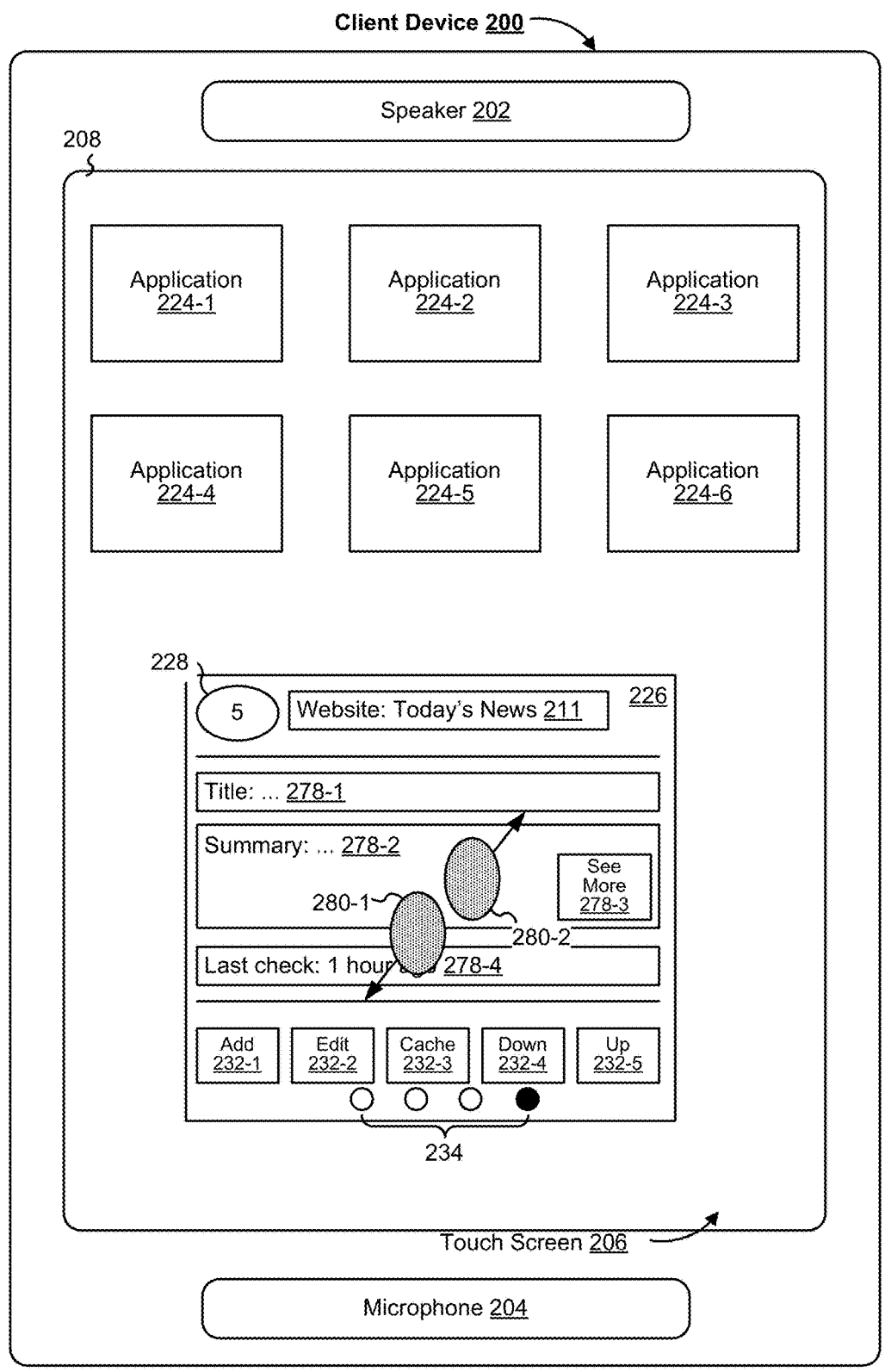

In some embodiments, an update indicator is displayed on the widget indicating the number of updates to the webpage (or the number portions of the webpage that have been updated) since the user last visited the webpage. For example, the update indicator flashes, turns a specified color, or displays an icon (e.g., a flag) when the webpage includes updated content. In another example, the update indicator displays a number indicating the number of updated content items or the number sub-blocks with updated content. In FIG. 2C, widget 226 includes update indicator 228 (e.g., a flag) indicating that webpage 227 includes updated content. In FIG. 2I, for example, widget 226 includes update indicator 228 displaying the number 5 indicating that webpage 211 includes 5 sub-blocks with updated content.

In some embodiments, displaying the indication of the updated content includes displaying at least a portion of the summary information corresponding to the webpage. In some embodiments, the portion of the summary information is a blurb that summarizes the original content (or only updated/new content) for the webpage or a sub-block thereof. In some embodiments, the blurbs are more detailed when the summary information is generated by the server than when the blurb is generated by the client device. In some embodiments, the client device optionally downloads additional summary information (e.g., more detailed summary information) to generate the blurb, after it is determined that the webpage includes updated content. In other words, the additional summary information is not downloaded, when there is no update indicated by the initially obtained summary information.

In one example, FIG. 2C shows widget 226 displaying a user interface for webpage 227 entitled "Tuba Review" which includes summary field 230-2 (e.g., a blurb summarizing the content of webpage 227). In a second example, FIG. 2D shows widget 226 displaying a user interface for webpage 238 entitled "Currency Studies" in response to detecting the swipe gesture in FIG. 2C. In this example, the user interface for webpage 238, in FIG. 2D, includes summary field 240-2 (e.g., a blurb summarizing the content of webpage 238).

Figure 2J:
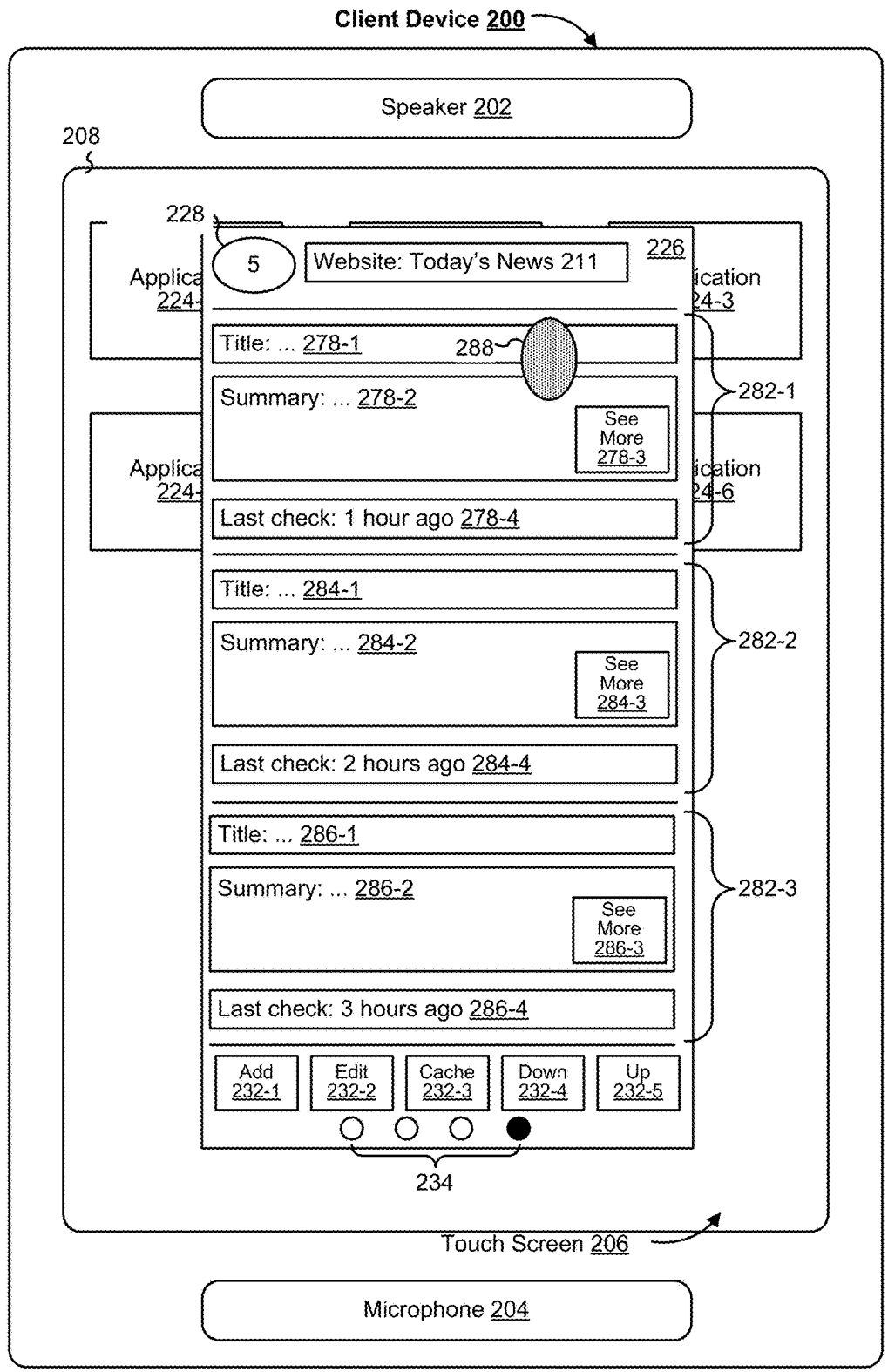

In some embodiments, the widget displays a blurb for each of a plurality of monitoring intervals for a webpage. For example, FIG. 2J shows widget 226 displaying an expanded user interface for webpage 211. In this example, the expanded user interface, in FIG. 2J, includes user interface portions 282-1, 282-2, and 282-3 with summary fields 278-2, 284-2, and 286-2, respectively, which correspond to each of three monitoring intervals (e.g., 1, 2, and 3 hours ago).

Figure 2K:
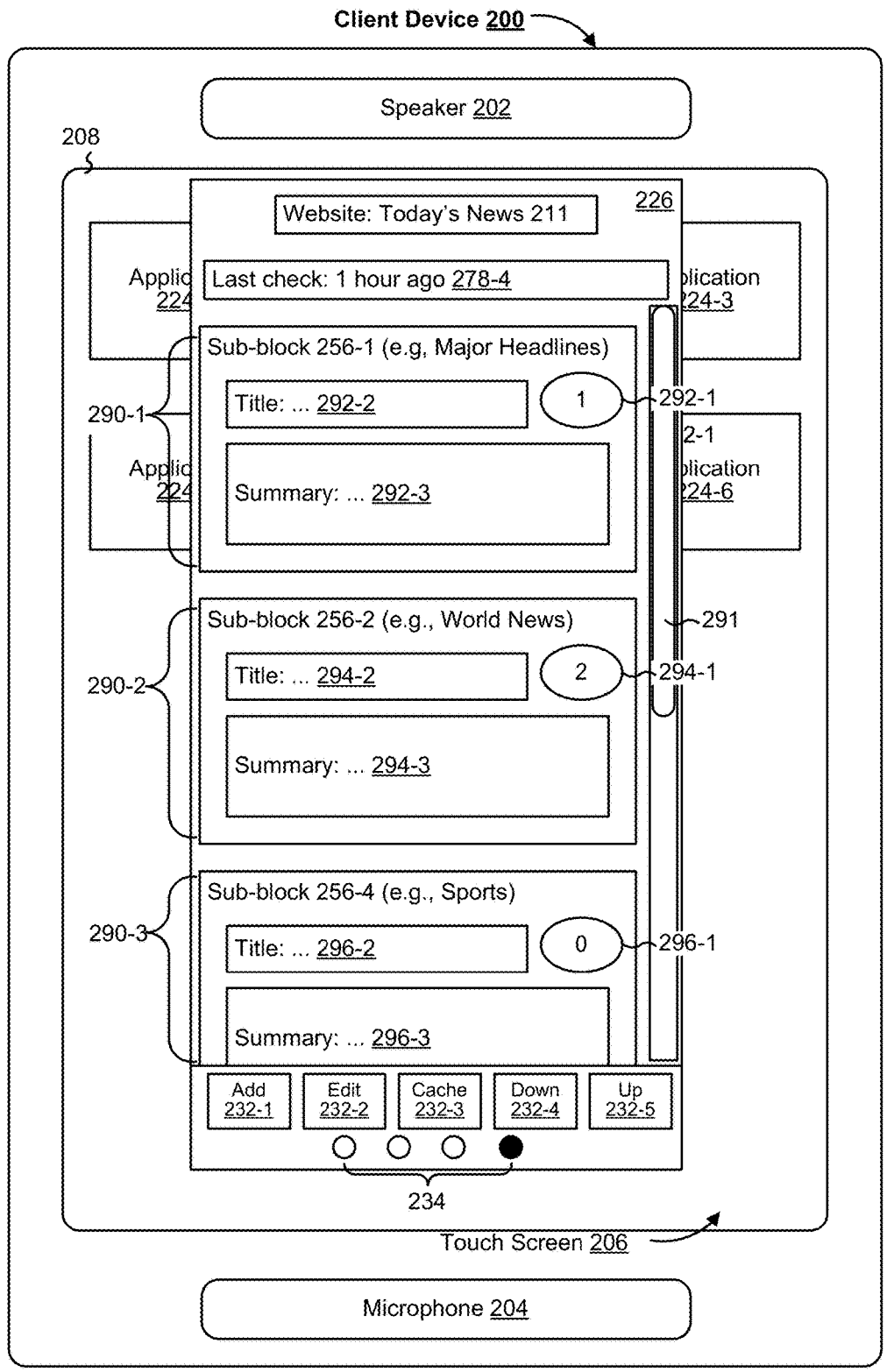

In some embodiments, the widget displays a blurb for each sub-block in a webpage that is being monitored. For example, FIG. 2K shows widget 226 displaying a sub-block view for webpage 211 in response to detecting contact 288 in FIG. 2J. In this example, the sub-block view includes a region for each of the sub-blocks of webpage 211 that were selected for monitoring in FIGS. 2F-2G: Major Headlines 256-1, World News 256-2, Sports 256-4, and Horoscopes 256-6 sub-blocks. Each of the regions in FIG. 2K includes a respective summary field (e.g., a blurb summarizing the content of a corresponding sub-block).

In some embodiments, the user is enabled to expand a displayed blurb by selecting a "see more" affordance or performing a de-pinch (or "expand") gesture at a location originating in the blurb. In one example, in FIG. 2C, a user is enabled to expand summary field 230-2, which includes a blurb summarizing the content of webpage 227, by selecting see more affordance 230-3 (e.g., with a tap gesture using the user's finger). In another example, with reference to FIG. 2C, the user of client device 200 is enabled to expand summary field 230-2 by performing a de-pinch gesture inside of summary field 230-2.

In some embodiments, after presenting the indication of the update content, the electronic device: receives a third user input corresponding to a request to cache the webpage including the updated content; and in response to receiving the third user input, caches the webpage including the updated content. For example, the user selects a cache affordance (e.g., cache affordance 232-3 in FIG. 2C) provided by the widget or performs a cache command/gesture to cache the webpage and/or the summary information. In some embodiments, the widget caches the webpage and/or the summary information locally (e.g., at client device 200, FIGS. 2A-2Q and 4-5), or causes the webpage and/or the summary information to be cached remotely (e.g., at server system 404, FIGS. 4 and 6), for later viewing by the user. This facilitates comparison between later obtained summary information and the cached summary information of the webpage, so as to improve the comparison efficiency. In some embodiments, the user device determines the current network connection type, and if the user device is currently connected to a WiFi network, the webpage is cached locally, and if the user device is currently connected to a cellular data network, the webpage is cached remotely on a server (e.g., the user device sends a caching request to the server when a content update has been detected by the user device).

In some embodiments, a widget associated with a preset URL is presented by a client device, and the widget obtains current summary information of a webpage corresponding to the preset URL. The widget determines whether the webpage includes updated content based on the current obtained summary information. For example, the widget makes the determination by comparing the current summary information with previously obtained summary information. In accordance with a determination that the webpage includes updated content, the widget displays information indicating that the webpage includes updated content. Whether the page is updated can be timely displayed through the widget, the operation is simple and convenient.

In some embodiments, the widget timely displays whether a webpage includes updated content. The operation is simple and convenient, and the widget can be viewed without tediously clicking or refreshing the browser. This also improves the battery life of the client device. Furthermore, after a monitoring frequency is set, the webpage is monitored for updated content obtained more effectively and efficiently. This also improves the timeliness while avoiding frequent (or constant) monitoring. Compared with the conventional manner of operating the web browser, energy consumption is further reduced.

Attention is now directed towards embodiments of user interfaces and associated processes that may be implemented on a respective client device 200 with one or more speakers 202 enabled to output sound, one or more microphones 204 enabled to receive sound input, and a touch screen 206 enabled to receive one or more contacts and display information (e.g., media content, webpages and/or user interfaces for a widget or application). FIGS. 2A-2Q illustrate exemplary user interfaces for notifying a user of updated content for a webpage in accordance with some embodiments.

FIGS. 2A-2Q show user interface 208 displayed on client device 200 (e.g., a mobile phone); however, one skilled in the art will appreciate that the user interfaces shown in FIGS. 2A-2Q may be implemented on other similar computing devices. The embodiments described above with reference to FIG. 1 provide a basis for the embodiments described below with reference to FIGS. 2A-2Q. The user interfaces in FIGS. 2A-2Q are used to illustrate the processes described herein, including the processes described with respect to FIG. 1.

FIG. 2A illustrates client device 200 displaying a webpage on touch screen 206 in a web browser being executed by client device 200. In FIG. 2A, the web browser includes an address bar 210 indicating that the web browser is displaying webpage 211 corresponding to a URL: http://www.todaysnews.com/main entitled "Today's News." In FIG. 2A, the webpage is divided into a plurality of portions or sub-blocks 212 with corresponding text. In FIG. 2A, displayed sub-blocks include: Major Headlines 212-1, World News 212-2, Chinese News 212-3, Sports 212-4, Cooking 212-5, Celebrities 212-6, and Horoscope 212-7. In FIG. 2A, the web browser includes scroll bar 213 indicating that the user is able to scroll downwards to view the balance of the webpage (i.e., other non-displayed sub-blocks).

In FIG. 2A, the web browser also includes a plurality of navigation and control affordances 214 (sometimes also called user interface objects or buttons). Back affordance 214-1 when activated (e.g., by a touch input from the user), causes the web browser to display a previously viewed webpage. Forward affordance 214-2 when activated (e.g., by a touch input from the user), causes the web browser to display a next webpage. Home affordance 214-3 when activated (e.g., by a touch input from the user), causes the web browser to display a home webpage designated by the user of client device 200. Options affordance 214-4 when activated (e.g., by a touch input from the user), causes the web browser to display an options panel (e.g., options panel 218 in FIG. 2B) to perform one of a plurality of operations associated with the currently displayed webpage. Open tabs affordance 214-5 when activated (e.g., by a touch input from the user), causes the web browser to display an interface including all tabs currently open within the web browser, where the interface enables the user of client device 200 to navigate to another tab. New tab affordance 214-6 when activated (e.g., by a touch input from the user), causes the web browser to display a new tab (e.g., starting on the home webpage designated by the user of client device 200). FIG. 2A further illustrates client device 200 detecting contact 216 (e.g., a tap gesture with the user's finger) (sometimes also called a user input or interaction) at a location corresponding to "Options" affordance 214-4 on touch screen 206.

FIG. 2B illustrates client device 200 displaying options panel 218 over the webpage in response to detecting contact 216 in FIG. 2A. In FIG. 2B, options panel 218 includes a plurality of affordances for performing operations associated with the currently displayed webpage. Font affordance 220-1 when activated (e.g., by a touch input from the user), causes the web browser to display options for changing the font, style and/or zoom of the text displayed by the web browser. Add to favorites affordance 220-2 when activated (e.g., by a touch input from the user), causes the web browser to add the currently displayed webpage to a list of favorite webpages for the user of client device 200. Bookmark affordance 220-3 when activated (e.g., by a touch input from the user), causes the web browser to bookmark the currently displayed webpage for subsequent viewing by the user of client device 200. Send to widget affordance 220-4 when activated (e.g., by a touch input from the user), causes client device 200 to send a request to a widget being executed on client device 200 to monitor the currently displayed webpage. View source code affordance 220-5 when activated (e.g., by a touch input from the user), causes the web browser to display the source code associated with the currently displayed webpage (e.g., HTML, CSS, Java, etc.). FIG. 2B further illustrates client device 200 detecting contact 222 (e.g., a tap gesture with the user's finger) at a location corresponding to "Send to Widget" affordance 220-4 on touch screen 206.

FIG. 2C illustrates client device 200 displaying user interface 208 for a home screen on touch screen 206. In FIG. 2C, user interface 208 for the home screen includes a plurality of application icons 224 (e.g., application icons 224-1 through 224-6), where, each of the application icons, when activated (e.g., by a touch input from a user), causes client device 200 to execute and display a corresponding application (e.g., a weather application, a media player application, a news aggregator application, a social media application, etc.). In FIG. 2C, user interface 208 for the home screen also includes widget 226 for notifying a user of updated content for one or more webpages being monitored.

FIG. 2C also illustrates widget 226 displaying a user interface for webpage 227 entitled "Tuba Review." In FIG. 2C, widget 226 includes update indicator 228 indicating whether webpage 227 includes updated content compared to the last check. For example, update indicator 228 will flash, turn a specified color, or display an icon (e.g., a flag) when the latest check determines that the webpage includes updated content. In FIG. 2C, widget 226 also includes title field 230-1 and summary field 230-2 for webpage 227. For example, title field 230-1 corresponds to information provided in the header of webpage 227 and summary field 230-2 includes a blurb summarizing the content of webpage 227. In FIG. 2C, widget 226 also includes see more affordance 220-3, which when activated (e.g., by a touch input from the user), causes the widget to display the balance of the summary field 230-2 that is not displayed in FIG. 2C (e.g., by expanding summary field 230-2). In FIG. 2C, widget 226 further includes monitoring interval field 230-4 indicating the last time webpage 227 was checked for new content (e.g., 1 hour ago). For example, widget 226 checks the webpage for new content according to a monitoring frequency (e.g., every 15, 30, 60, etc. minutes) that is set by the user of client device 200.

In FIG. 2C, widget 226 includes a plurality of navigation and control affordances 232. Add affordance 232-1 when activated (e.g., by a touch input from the user), causes the widget to display an addition panel (e.g., addition panel 244 in FIG. 2E) for adding a webpage to be monitored. Edit affordance 232-2 when activated (e.g., by a touch input from the user), causes the widget to display options for editing the URL associated with webpage 227 and a monitoring frequency associated with webpage 227. Cache affordance 232-3 when activated (e.g., by a touch input from the user), causes the widget to cache, or send a request to a server system to cache, webpage 227 and/or summary information associated with webpage 227. Scroll down affordance 232-4 when activated (e.g., by a touch input from the user), causes the widget to scroll downwards in the user interface for webpage 227 to display information associated with a monitoring interval preceding monitoring interval 230-4 (if one exists). Scroll up affordance 232-5 when activated (e.g., by a touch input from the user), causes the widget to scroll upwards in the user interface for webpage 227 to display information associated with a monitoring interval following monitoring interval 230-4 (if one exists). In FIG. 2C, widget 226 also includes a set of navigation indicators 234 which indicate the total number of webpages being monitored by widget 226 and the order assigned to webpage 227 (e.g., the shaded circle) among the other webpages being monitored. FIG. 2C further illustrates client device 200 detecting a left-right swipe gesture with contact 236 originating at a location inside of the user interface for widget 226 on touch screen 206.

FIG. 2D illustrates widget 226 displaying a user interface for webpage 238 entitled "Currency Studies" in response to detecting the swipe gesture in FIG. 2C. FIG. 2D also illustrates client device 200 detecting contact 242 (e.g., a tap gesture with the user's finger) at a location corresponding to "Add" affordance 232-1 on touch screen 206.

FIG. 2E illustrates widget 226 displaying addition panel 244 in response to detecting contact 242 in FIG. 2D. In FIG. 2E, addition panel 244 includes website field 246 where a user of 200 is enabled to enter a URL for a webpage to be monitored (e.g., http://www.todaysnews.com/main). For example, the user is enabled to enter the URL via a virtual keyboard or speech-to-text commands. In FIG. 2E, addition panel 244 also includes continue affordance 248, which when activated (e.g., by a touch input from the user), causes the widget to display a selection panel (e.g., selection panel 254 in FIG. 2F) and back affordance 250, which when activated (e.g., by a touch input from the user), causes the widget to redisplay the user interface for webpage 238 (e.g., as shown in FIG. 2D). FIG. 2E also illustrates client device 200 detecting contact 252 (e.g., a tap gesture with the user's finger) at a location corresponding to "Continue" affordance 248 on touch screen 206.

FIG. 2F illustrates widget 226 displaying selection panel 254 in response to detecting contact 222 in FIG. 2B or contact 242 in FIG. 2E. In FIG. 2F, selection panel 254 includes an on/off affordance associated for each of sub-blocks 256 for webpage 211 (e.g., http://www.todaysnews.com/main). When a respective on/off affordance is in the "on" position, the corresponding sub-block will be monitored. In FIG. 2F, selection panel 254 is in a first state where the on/off affordances are all in the "off" position. For example, sub-blocks 256 comprising webpage 211 include: Major Headlines 256-1, World News 256-2, Chinese News 256-3, Sports 256-4, Cooking 256-5, Celebrities 256-6, and Horoscope 256-7.

In FIG. 2F, the plurality of on/off affordances enable the user of client device 200 to select particular sub-blocks of webpage 211 to monitor. In FIG. 2F, selection panel 254 also includes continue affordance 258, which when activated (e.g., by a touch input from the user), causes the widget to display a frequency panel (e.g., frequency panel 266 in FIG. 2H) and back affordance 260, which when activated (e.g., by a touch input from the user), causes the widget to redisplay addition panel 244 (e.g., as shown in FIG. 2E). FIG. 2F further illustrates client device 200 detecting a plurality of swipe gestures including: a right-to-left swipe gesture with contact 262-1 originating at a location corresponding to the on/off affordance associated with sub-block 256-1, a right-to-left swipe gesture with contact 262-2 originating at a location corresponding to the on/off affordance associated with sub-block 256-2, a right-to-left swipe gesture with contact 262-3 originating at a location corresponding to the on/off affordance associated with sub-block 256-4, and a right-to-left swipe gesture with contact 262-4 originating at a location corresponding to the on/off affordance associated with sub-block 256-6.

FIG. 2G illustrates client device 200 displaying selection panel 254 associated with widget 226 in response to detecting the plurality of swipe gestures in FIG. 2F. In FIG. 2G, on/off affordances associated with sub-blocks 256-1, 256-2, 256-4, and 256-6 are in the "on" position. For example, according to the configuration of the on/off affordances in FIG. 2G, widget 226 will only monitor Major headlines 256-1, World News 256-2, Sports 256-4, and Horoscopes 256-6 sub-blocks of webpage 211. FIG. 2G also illustrates client device 200 detecting contact 264 (e.g., a tap gesture with the user's finger) at a location corresponding to "Continue" affordance 258 on touch screen 206.

FIG. 2H illustrates widget 226 displaying frequency panel 266 in response to detecting contact 264 in FIG. 2G. In FIG. 2H, frequency panel 266 includes monitoring frequency adjustment user interface elements 270 for sub-blocks 256-1, 256-2, 256-4, and 256-6 (e.g., the sub-blocks selected in FIGS. 2F-2G). In FIG. 2H, respective monitoring frequency adjustment user interface elements 270-1 includes the current monitoring frequency for sub-block 256-1 (e.g., default 60 minutes) and +/−affordances for increasing or decreasing, respectively, the monitoring frequency for sub-block 256-1. In FIG. 2H, frequency panel 266 also includes continue affordance 272, which when activated (e.g., by a touch input from the user), causes the widget to redisplay the user interface for the home screen (e.g., as shown in FIG. 2D) and back affordance 274, which when activated (e.g., by a touch input from the user), causes the widget to redisplay selection panel 254 (e.g., as shown in FIG. 2G). FIG. 2H also illustrates client device 200 detecting contact 276 (e.g., a tap gesture with the user's finger) at a location corresponding to "Continue" affordance 272 on touch screen 206.

FIG. 2I illustrates client device 200 displaying user interface 208 for a home screen on touch screen 206 in response to detecting contact 276 in FIG. 2H. In FIG. 2I, user interface 208 for the home screen includes a plurality of application icons 224 and widget 226 for notifying a user of updated content for one or more webpages being monitored. FIG. 2I also illustrates widget 226 displaying a user interface for webpage 211 entitled "Today's News" (e.g., corresponding to http://www.todaysnews.com/main).

In FIG. 2I, widget 226 includes update indicator 228 displaying the number 5 indicating that webpage 211 includes 5 sub-blocks with updated content compared to the last check. In FIG. 2I, widget 226 also includes title field 278-1 and summary field 278-2 for webpage 211. In FIG. 2I, widget 226 also includes see more affordance 278-3, which when activated (e.g., by a touch input from the user), causes the widget to display the balance of the summary field 278-2 that is not displayed in FIG. 2I. In FIG. 2I, widget 226 further includes monitoring interval field 278-4 indicating that webpage 211 was lasted checked for new content 1 hour ago. In FIG. 2I, widget 226 also includes a set of navigation indicators 234 indicating that 4 webpages are being monitored by widget 226 where the shaded circle represents webpage 211. FIG. 2I further illustrates client device 200 detecting a de-pinch gesture with contacts 280-1 and 280-2 at a location originating in the user interface for widget 226 on touch screen 206.

FIG. 2J illustrates widget 226 displaying an expanded user interface for webpage 211 in response to detecting the de-pinch gesture in FIG. 2I. In FIG. 2J, widget 226 includes user interface portions 282-1, 282-2, and 282-3 with summary fields 278-2, 284-2, and 286-2, respectively, which corresponds to each of three monitoring intervals (e.g., 1, 2, and 3 hours ago). Respective user interface portion 282-3 includes title field 286-1 and summary field 286-2, see more affordance 286-3, and monitoring interval field 286-4 indicating that user interface portion 282-3 corresponds to a check of webpage 211 for new content 3 hours ago. FIG. 2J also illustrates client device 200 detecting contact 288 (e.g., a tap gesture with the user's finger) at a location corresponding to user interface portion 282-1 on touch screen 206.

FIG. 2K illustrates widget 226 displaying a sub-block view for webpage 211 in response to detecting contact 288 in FIG. 2J. In FIG. 2K, the sub-block view for webpage 211 corresponds to monitoring interval 278-4 (e.g., a last check of webpage 211 for new content 1 hour ago). In FIG. 2K, the sub-block view includes region 290 for each of the sub-blocks of webpage 211 that were selected for monitoring in FIGS. 2F-2G: Major Headlines 256-1, World News 256-2, Sports 256-4, and Horoscopes 256-6 sub-blocks. In FIG. 2K, region 290-1, 290-2, and 290-3 for sub-blocks 256-1, 256-2, and 256-4, respectively, are visible; however, a region for sub-block 256-6 is accessible by scrolling downwards with scroll bar 291.

In FIG. 2K, region 290-1 associated with sub-block 256-1 (e.g., Major Headlines) includes update indicator 292-1 indicating that 1 change was detected in sub-block 256-1 since the last monitoring interval, title field 292-2, and summary field 292-3. In FIG. 2K, region 290-2 associated with sub-block 256-2 (e.g., World News) includes update indicator 294-1 indicating that 2 changes were detected in sub-block 256-2 since the last monitoring interval, title field 294-2, and summary field 294-3. In FIG. 2K, region 290-3 associated with sub-block 256-4 (e.g., Sports) includes update indicator 296-1 indicating that no changes were detected in sub-block 256-4 since the last monitoring interval, title field 296-2, and summary field 296-3.

Figure 2L:
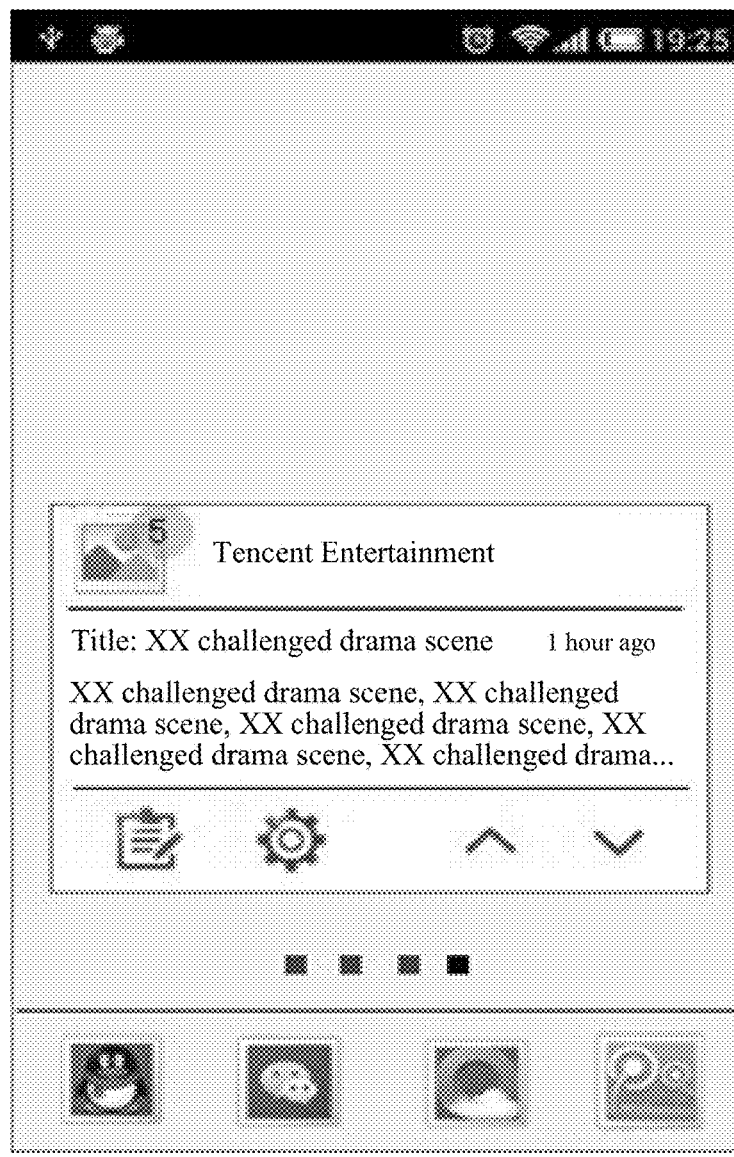
Figure 2M:
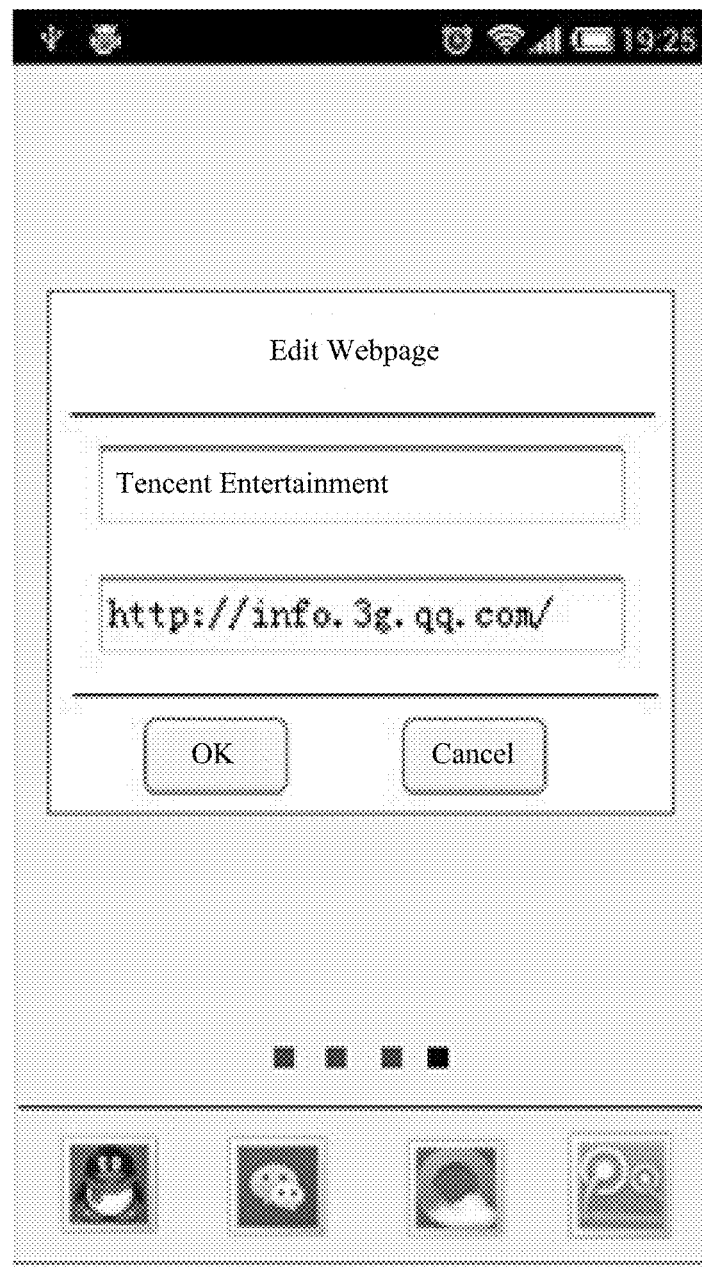
Figure 2N:
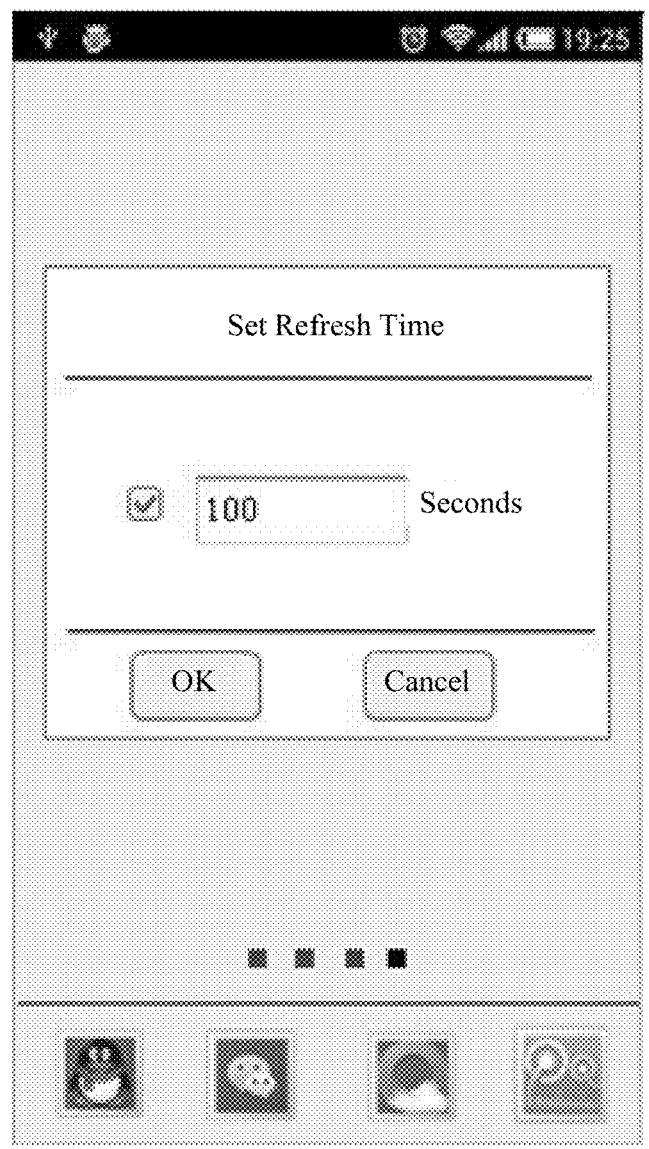
Figure 2O:
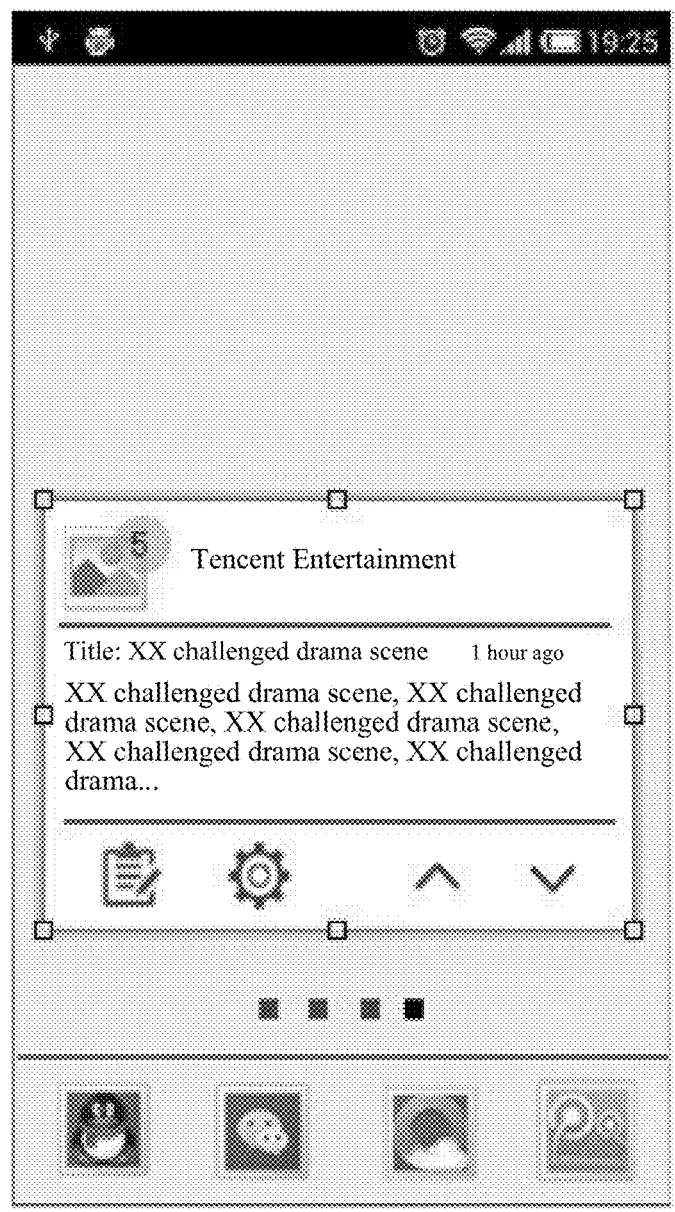
Figure 2P:
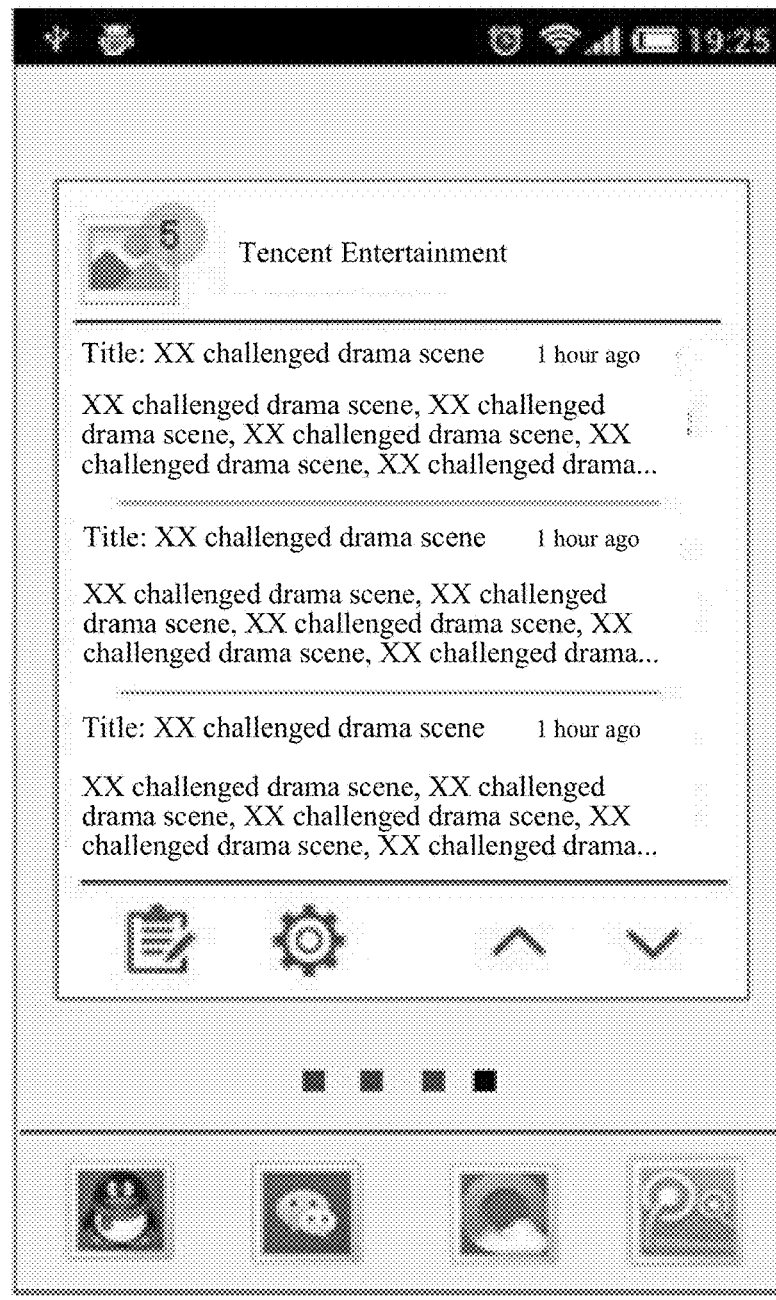
Figure 2Q:

FIG. 2L is a user interface of the widget displayed on the client device. In FIG. 2L, the icon in the upper-left corner of the widget displays the number of the currently updated content portions. In FIG. 2L, the page name and the text portion of the widget are enabled to receive a user input, and the corresponding page is entered by calling a browser. The user may jump to an edit interface shown in FIG. 2M through an edit key (e.g., the gear/sprocket icon displayed in FIG. 2L). User edit information is received and a URL to be monitored is set. The user may jump to a settings interface shown in FIG. 2N through a set key (e.g., the displayed clipboard icon displayed in FIG. 2L). The user is enabled to set the monitoring frequency for the page. The user can adjust the size of the widget as shown in FIG. 2O by pressing a location corresponding to the widget for a predetermined time period. FIG. 2P illustrates the widget after adjustment in FIG. 2O. FIG. 2Q illustrates the client device displaying a webpage in a web browser and the user selecting an option within the web browser send the current URL to the widget for subsequent monitoring.

In some embodiments, the widget timely displays whether a webpage includes updated content. The operation is simple and convenient, and the widget can be viewed without tediously clicking or refreshing the browser. This also improves the battery life of the client device. Furthermore, after a monitoring frequency is set, the webpage is monitored for updated content obtained more effectively and efficiently. This also improves the timeliness while avoiding frequent (or constant) monitoring. Compared with the conventional manner of operating the web browser, energy consumption is further reduced.

Figure 3:
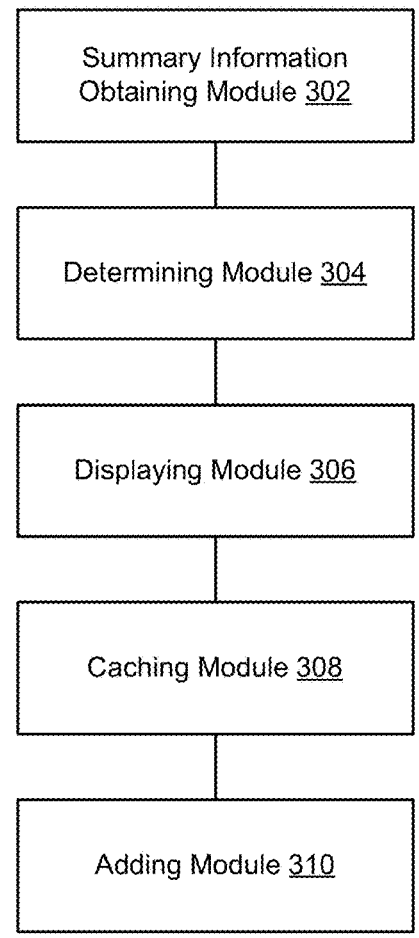
FIG. 3 is a block diagram of a client-side module for notifying a user of updated content for a webpage in accordance with some embodiments.

FIG. 3 is a block diagram of a client-side module 300 for notifying a user of updated content for a webpage in accordance with some embodiments.

In some embodiments, client-side module 300 is associated with a widget or a portion thereof which is executed at a client device (e.g., client device 200, FIGS. 2A-2Q and 4-5). In some embodiments, client-side module 300 includes: summary information obtaining module 302, determining module 304, displaying module 306, and caching module 308. In some embodiments, the summary information of the webpage includes one or more of page name, text keyword, and update time.

In some embodiments, summary information obtaining module 302 is configured to obtain summary information for a webpage (or one or more sub-blocks thereof) corresponding to a preset URL. In some embodiments, information obtaining module 302 obtains summary information for the webpage according to a monitoring frequency or specified time interval.

In some embodiments, determining module 304 is configured to determine whether the webpage includes updated content. In some embodiments, determining module 304 makes the determination by comparing current summary information with previously obtained summary information.

In some embodiments, displaying module 306 is configured to display a user interface for the widget and an indication (e.g., a badge, notification, or pop-up window) that the webpage being monitored includes updated content in accordance with a determination that the webpage includes updated content.

This operation is simple and convenient, and the widget can be viewed without tediously clicking or refreshing the web browser. Thus, less power is consumed by the client device thereby improving the battery life of the client device.

In some embodiments, client module 300 further includes caching module 308. In some embodiments, caching module 308 is configured to store the webpage and/or summary information of the webpage when the webpage includes updated content. In some embodiments, caching module 308 stores the webpage and/or summary information in memory that is local to the client device. In some embodiments, caching module 308 causes the webpage and/or summary information to be stored in memory that is remote from the client device (e.g., at server system 404, FIGS. 4 and 6).

In some embodiments, client module 300 further includes adding module 310 to improve ease of operation. In some embodiments, adding module 310 is configured to obtain and store a URL of a page currently displayed by a browser. In some embodiments, the user is enabled to add a webpage currently being displayed in a web browser to the widget for monitoring.

In some embodiments, when client module 300 monitors more than one webpage (e.g., includes more than one URL address), client module 300 further includes: a statistics module. In some embodiments, the statistics module is configured to generate statistics on the number of the page having the updated content, and the user interface for the widget includes information of the number of the page having the updated content.

Figure 4:
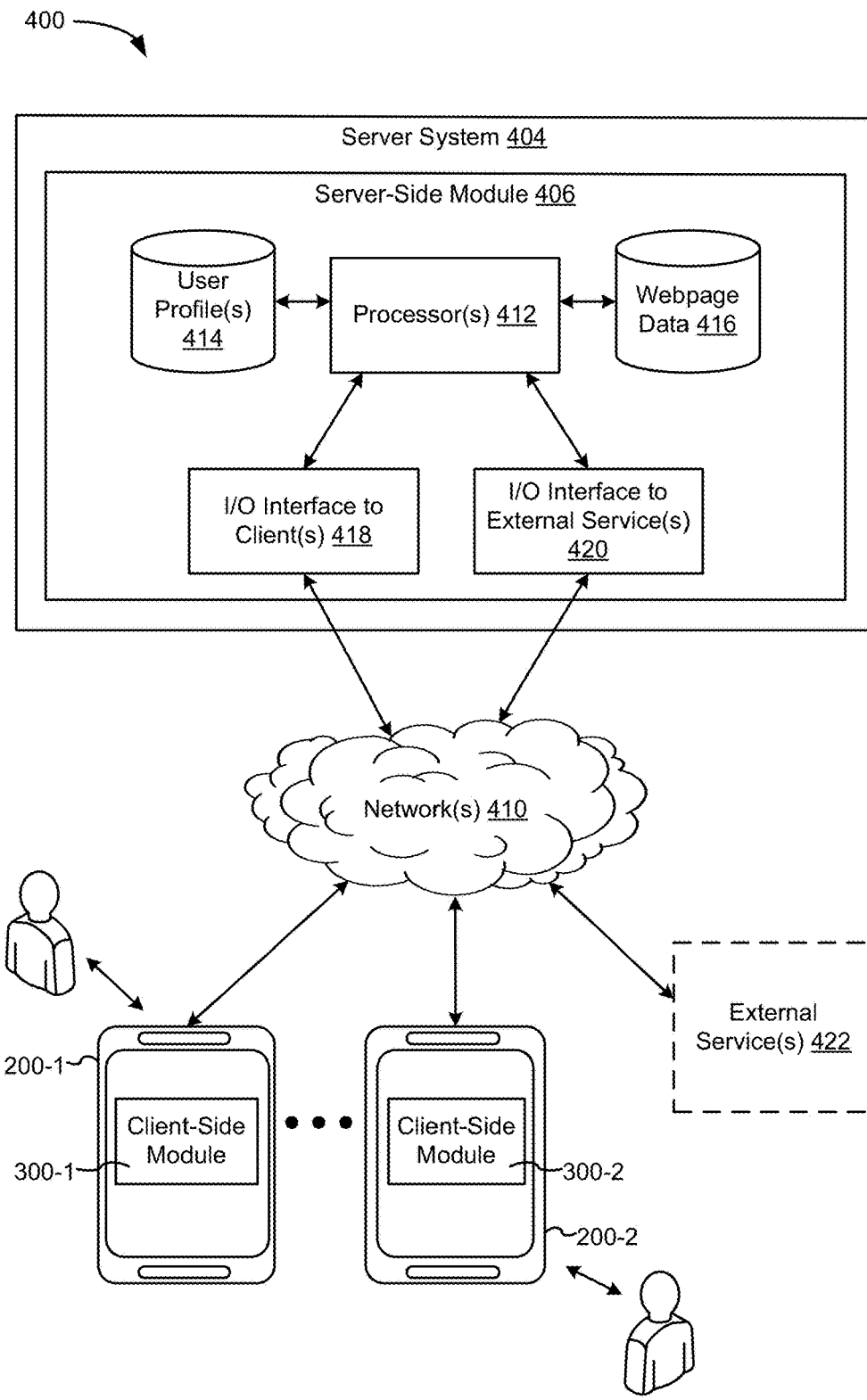
FIG. 4 is a block diagram of a server-client environment in accordance with some embodiments.

As shown in FIG. 4, in some embodiments, data processing for a widget (or application) is implemented in a server-client environment 400. Data processing for the widget includes client-side processing 300-1, 300-2 (hereinafter "client-side module 300") executed on a client device 200-1, 200-2 and server-side processing 406 (hereinafter "server-side module 406") executed on a server system 404. Client-side module 300 communicates with server-side module 406 through one or more networks 410. Client-side module 300 provides client-side functionalities associated with the widget (e.g., monitoring one or more webpages for updated content) such as client-facing input and output processing, communications with server-side module 406. Server-side module 406 provides server-side functionalities associated with the widget (e.g., monitoring one or more webpages for updated content) for any number of client modules 300 each residing on a respective client device 200.

In some embodiments, server-side module 406 includes one or more processors 412, one or more user profiles 414, webpage data 416, an I/O interface to one or more clients 418, and an I/O interface to one or more external services 420. I/O interface to one or more clients 418 facilitates the client-facing input and output processing for server-side module 406. One or more processors 412 receive requests from client-side module 300 to monitor one or more webpages or portion(s) thereof for updated content. One or more user profiles 414 store a user profile for each client-side module 300 corresponding to one or more webpages or portion(s) thereof to monitor for updated content, and webpage data 416 stores summary information and/or a portion of the source code associated with monitored webpages. In some embodiments, server-side module 406 communicates with one or more external services 422 (e.g., content aggregation or content summarization services) through one or more networks 410. I/O interface to one or more external services 420 facilitates such communications.

Examples of client device 200 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 410 include local area networks ("LAN") and wide area networks ("WAN") such as the Internet. One or more networks 410 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 404 is implemented on one or more standalone data processing apparatuses or a distributed network of computers. In some embodiments, server system 404 also employs various virtual devices and/or services of third party service providers (e.g., third-party cloud service providers) to provide the underlying computing resources and/or infrastructure resources of server system 404.

Although server-client environment 400 shown in FIG. 4 includes both a client-side portion (e.g., client-side module 300) and a server-side portion (e.g., server-side module 406), in some embodiments, data processing is implemented as a standalone application installed on client device 200. In addition, the division of functionalities between the client and server portions of client environment data processing can vary in different embodiments. For example, in some embodiments, client-side module 300 is a thin-client that provides only user-facing input and output processing functions, and delegates all other data processing functionalities to a backend server (e.g., server system 404).

Figure 5:
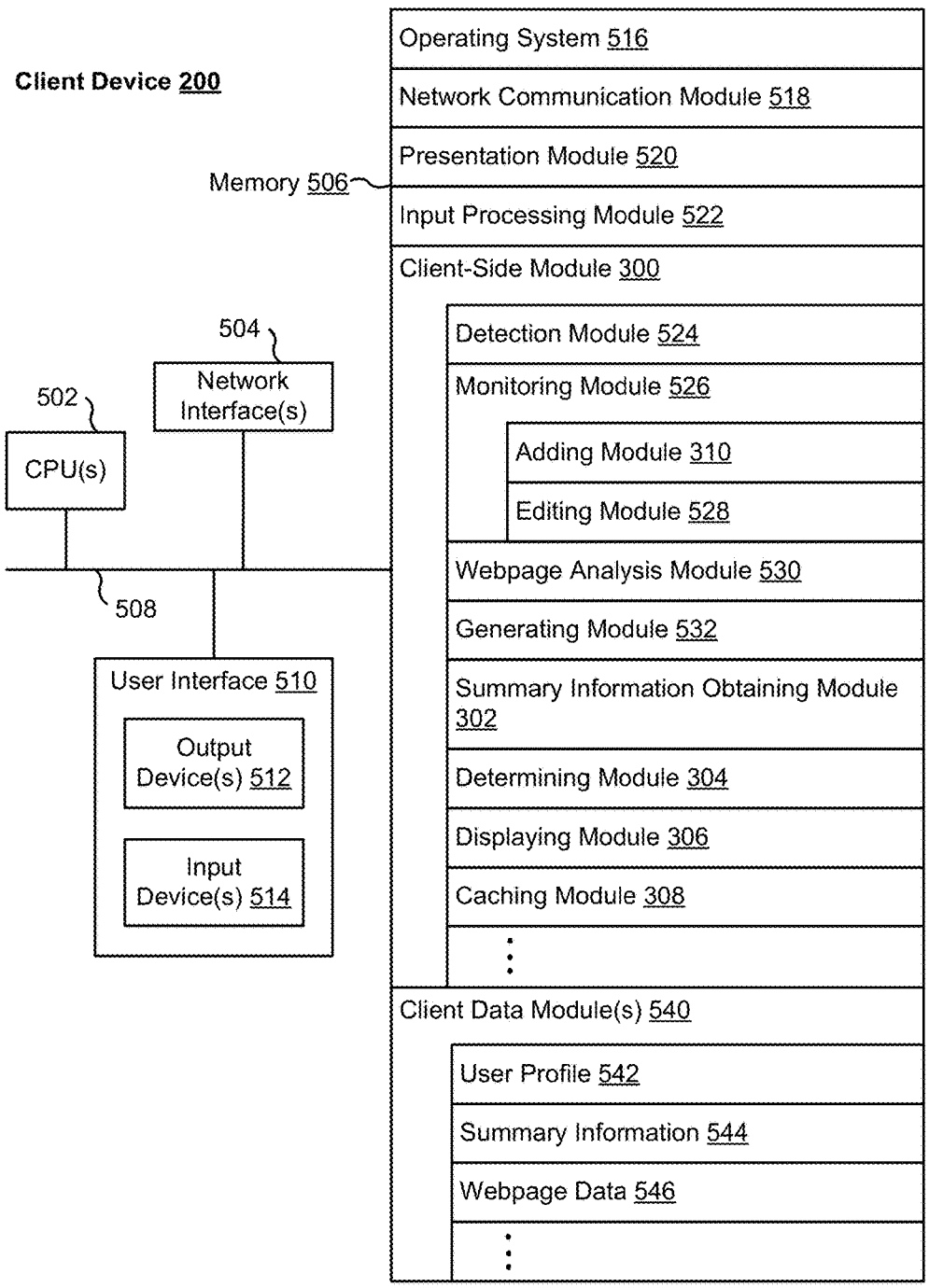
FIG. 5 is a block diagram of a client device in accordance with some embodiments.

FIG. 5 is a block diagram illustrating a representative client device 200 associated with a user in accordance with some embodiments. Client device 200, typically, includes one or more processing units (CPUs) 502, one or more network interfaces 504, memory 506, and one or more communication buses 508 for interconnecting these components (sometimes called a chipset). Client device 200 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch-screen display, a touch-sensitive input pad, a gesture capturing camera, or other input buttons or controls. Furthermore, some client devices 200 use a microphone and voice recognition or a camera and gesture recognition to supplement or replace the keyboard. Memory 506 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 506, optionally, includes one or more storage devices remotely located from one or more processing units 502. Memory 506, or alternatively the non-volatile memory device(s) within memory 506, includes a non-transitory computer readable storage medium. In some implementations, memory 506, or the non-transitory computer readable storage medium of memory 506, stores the following programs, modules, and data structures, or a subset or superset thereof:

- operating system 516 including procedures for handling various basic system services and for performing hardware dependent tasks;
- network communication module 518 for connecting user device 200 to other computing devices (e.g., server system 404) connected to one or more networks 410 via one or more network interfaces 504 (wired or wireless);
- presentation module 520 for enabling presentation of information (e.g., a user interface for a widget, webpage, or an application, audio and/or video content, text, etc.) at client device 200 via one or more output devices 512 (e.g., displays, speakers, etc.) associated with user interface 510; and
- input processing module 522 for detecting one or more user inputs or interactions from one of the one or more input devices 514 and interpreting the detected input or interaction.

In some embodiments, memory 506 also includes a client-side module 300 (e.g., a widget or application) for monitoring one or more webpages and/or one or more portions thereof (e.g., sub-blocks) for updated content. Client-side module 300 includes, but is not limited to:

- detection module 524 for detecting one or more user inputs corresponding to the widget;
- monitoring module 526 for monitoring a webpage or a portion thereof for updated content in response to a request from the user of client device 200, including but not limited to:
  - adding module 310 for adding (or deleting) a webpage or a portion thereof to the widget for monitoring; and
  - editing module 528 for editing one or more monitoring parameters corresponding to a respective webpage or a portion thereof being monitored by the widget (e.g., monitoring frequency);
- webpage analysis module 530 for obtaining (e.g., retrieving or receiving) webpage data (e.g., source code) and identifying structurally discrete portions (e.g., sub-blocks) of a respective webpage being monitored;
- generating module 532 for generating summary information for a respective webpage or a portion thereof being monitored based on the webpage data;
- summary information obtaining module 302 for obtaining summary information for a respective webpage or a portion thereof being monitored;
- determining module 304 for determining whether a respective webpage or a portion thereof includes updated content (e.g., by comparing current summary information with previously obtained summary information);
- displaying module 306 for displaying a user interface for the widget and for displaying an indication (e.g., a badge, notification or pop-up window) that the webpage or a portion thereof being monitored includes updated content; and
- caching module 308 for storing or caching the webpage data and/or summary information for a respective webpage or the portion thereof with updated content.

In some embodiments, memory 506 also includes one or more client data modules 540 for storing data for the widget (or application). One or more client data modules 540 include, but are not limited to:

- user profile 542 associated with a respective user of client device 200, including webpages (or sub-blocks of each webpage) to be monitored and a monitoring frequency for the webpages (or sub-blocks);
- summary information 544 including cached summary information for webpages or a portion thereof with updated content; and
- webpage data 546 including webpage data (e.g., a portion of the source code) for webpages being monitored.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figure 6:
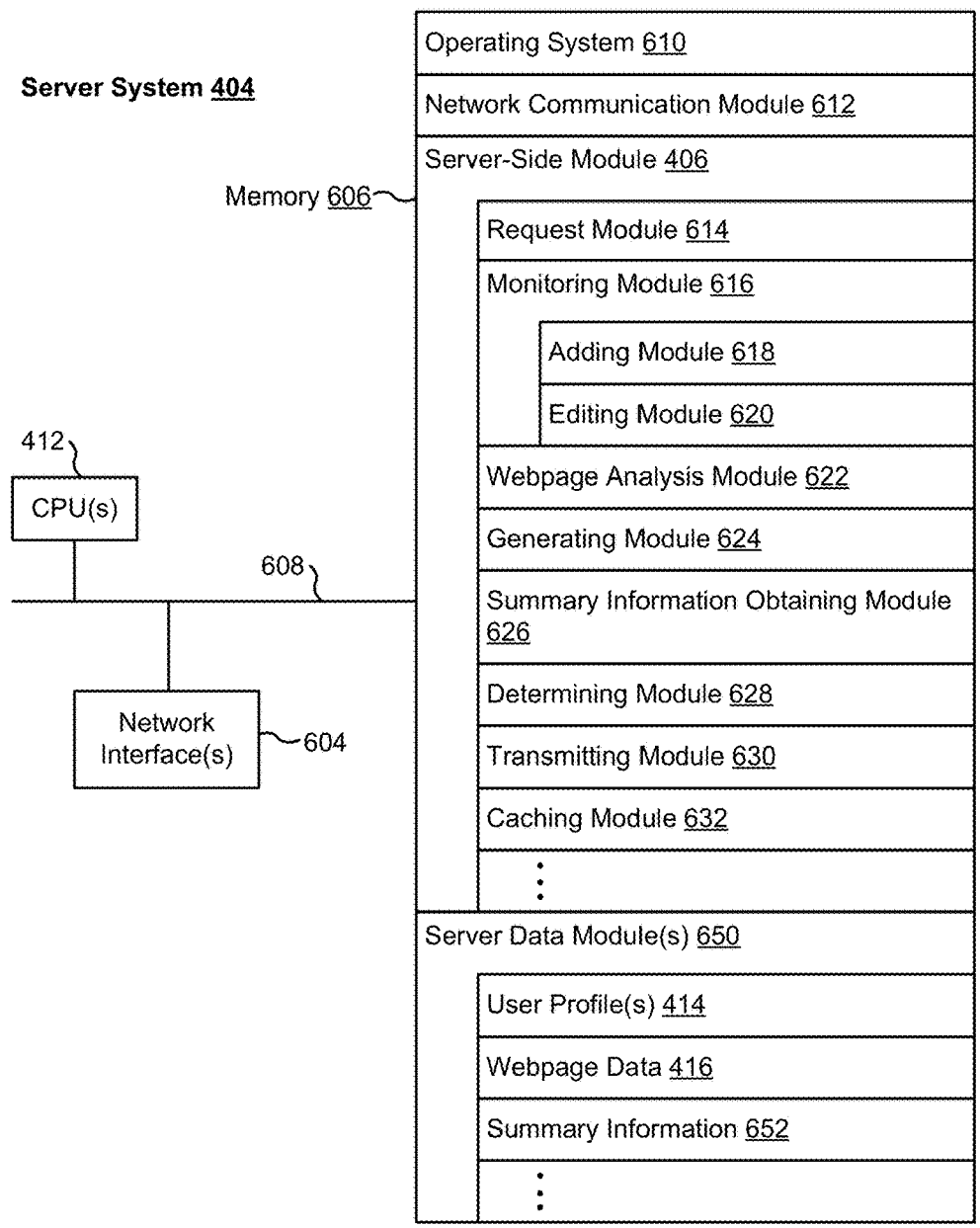
FIG. 6 is a block diagram of a server system in accordance with some embodiments.

FIG. 6 is a block diagram illustrating server system 404 in accordance with some embodiments. Server system 404, typically, includes one or more processing units (CPUs) 412, one or more network interfaces 604 (e.g., including I/O interface to one or more clients 418 and I/O interface to one or more external services 420), memory 606, and one or more communication buses 608 for interconnecting these components (sometimes called a chipset). Memory 606 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 606, optionally, includes one or more storage devices remotely located from one or more processing units 412. Memory 606, or alternatively the non-volatile memory device(s)

within memory 606, includes a non-transitory computer readable storage medium. In some implementations, memory 606, or the non-transitory computer readable storage medium of memory 606, stores the following programs, modules, and data structures, or a subset or superset thereof:
- operating system 610 including procedures for handling various basic system services and for performing hardware dependent tasks;
- network communication module 612 that is used for connecting server system 404 to other computing devices (e.g., client devices 200 and one or more external services 422) connected to one or more networks 410 via one or more network interfaces 604 (wired or wireless);
- a server-side module 406 (e.g., a widget or application) for monitoring one or more webpages and/or one or more portions thereof (e.g., sub-blocks) for updated content, including but not limited to:
  - request module 614 for receiving requests to monitor webpage(s) or portion(s) thereof from client devices 200;
  - monitoring module 616 for monitoring a webpage or a portion thereof for updated content in response to a request from the user of respective client device 200, including but not limited to:
    - adding module 618 for adding (or deleting) a webpage or a portion thereof to the widget for monitoring; and
    - editing module 620 for editing one or more monitoring parameters corresponding to a respective webpage or a portion thereof being monitored by the widget (e.g., monitoring frequency);
  - webpage analysis module 622 for obtaining (e.g., retrieving or receiving) webpage data (e.g., source code) and identifying structurally discrete portions (e.g., sub-blocks) of a respective webpage being monitored;
  - generating module 624 for generating summary information for a respective webpage or a portion thereof being monitored based on the webpage data;
  - summary information obtaining module 626 for obtaining summary information for a respective webpage or a portion thereof being monitored;
  - determining module 628 for determining whether a respective webpage or a portion thereof includes updated content (e.g., by comparing current summary information with previously obtained summary information);
  - transmitting module 630 for transmitting, to a client device 200, summary information and an indication that the webpage or a portion thereof includes updated content; and
  - caching module 632 storing or caching the webpage data and/or summary information for a respective webpage or the portion thereof with updated content;
- one or more server data modules 650, including but not limited to:
  - one or more user profiles 414 each associated with a user of a respective client device 200, including webpages (or sub-blocks of each webpage) to be monitored and a monitoring frequency for the webpages (or sub-blocks);
  - webpage data 416 including webpage data (e.g., a portion of the source code) for webpages being monitored; and
  - summary information 652 including cached summary information for webpages or a portion thereof with updated content.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of notifying a user of updated content for a webpage, the method comprising:
    at one or more electronic devices each with one or more processors and memory:
      receiving a user input corresponding to a request to monitor the webpage;
      obtaining, in accordance with a predetermined monitoring frequency, current summary information corresponding to the webpage, wherein summary information comprises a summary of content included in the webpage;
      determining whether the webpage includes updated content based on the current summary information corresponding to the webpage, including:
        comparing the current summary information with previously obtained summary information corresponding to the webpage; and
        determining whether the webpage includes updated content based on the comparison between the current summary information and the previously obtained summary information corresponding to the webpage; and
      in accordance with a determination that the webpage includes updated content, presenting an indication of the updated content, including concurrently presenting at least a portion of the current summary information corresponding to the webpage and an update indicator that includes a numerical tally of updates that have been made to the webpage during a current monitoring period in accordance with the predetermined monitoring frequency or a numerical tally of items that have been updated in the webpage during the current monitoring period in accordance with the predetermined monitoring frequency.

2. The method of claim 1, further comprising:
    generating the current summary information for the webpage by analyzing a portion of the webpage.

3. The method of claim 1, further comprising:
in response to receiving the user input corresponding to the request to monitor the webpage:
identifying a plurality of structurally discrete portions in the webpage by analyzing the webpage; and
presenting in a widget a respective selection affordance for individually monitoring each of the plurality of structurally discrete portions of the webpage.

4. The method of claim 3, wherein the user input is a first user input and the method further comprises:
receiving a second user input corresponding to a request to monitor a respective portion of the plurality of portions of the webpage via the respective selection affordance of the respective portion; and
in accordance with the second user input, starting individual monitoring of the respective portion of the webpage.

5. The method of claim 3, wherein the user input is a first user input and the method further comprises:
receiving a second user input selecting respective selection affordances of at least two of the plurality of discrete portions of the webpage; and
presenting a respective frequency affordance for each of the at least two discrete portions for independently setting a respective monitoring frequency for the discrete portion.

6. The method of claim 1, further comprising:
after presenting the indication of the updated content:
receiving an additional user input corresponding to a request to cache the webpage including the updated content; and
in response to receiving the additional user input, caching the webpage including the updated content.

7. The method of claim 1, further comprising:
while concurrently presenting at least the portion of the current summary information corresponding to the webpage and the update indicator, detecting a predefined user input for expanding the current summary information;
in response to receiving the predefined user input for expanding the current summary information, separately displaying respective numerical tallies of updates that have been made to a plurality of sub-blocks of the webpage.

8. An electronic device, comprising:
one or more processors; and
memory storing one or more programs to be executed by the one or more processors, the one or more programs comprising instructions for:
receiving a user input corresponding to a request to monitor the webpage;
obtaining, in accordance with a predetermined monitoring frequency, current summary information corresponding to the webpage, wherein summary information comprises a summary of content included in the webpage;
determining whether the webpage includes updated content based on the current summary information corresponding to the webpage, including:
comparing the current summary information with previously obtained summary information corresponding to the webpage; and
determining whether the webpage includes updated content based on the comparison between the current summary information and the previously obtained summary information corresponding to the webpage; and
in accordance with a determination that the webpage includes updated content, presenting an indication of the updated content, including concurrently presenting at least a portion of the current summary information corresponding to the webpage and an update indicator that includes a numerical tally of updates that have been made to the webpage during a current monitoring period in accordance with the predetermined monitoring frequency or a numerical tally of items that have been updated in the webpage during the current monitoring period in accordance with the predetermined monitoring frequency.

9. The electronic device of claim 8, further comprising:
generating the current summary information for the webpage by analyzing a portion of the webpage.

10. The electronic device of claim 8, wherein the one or more programs further comprise instructions for:
in response to receiving the user input corresponding to the request to monitor the webpage:
identifying a plurality of structurally discrete portions in the webpage by analyzing the webpage; and
presenting in a widget a respective selection affordance for individually monitoring each of the plurality of structurally discrete portions of the webpage.

11. The electronic device of claim 10, wherein the user input is a first user input and the one or more programs further comprise instructions for:
receiving a second user input corresponding to a request to monitor a respective portion of the plurality of portions of the webpage via the respective selection affordance of the respective portion; and
in accordance with the second user input, starting individual monitoring of the respective portion of the webpage.

12. The electronic device of claim 10, wherein the user input is a first user input and the one or more programs further comprise instructions for:
receiving a second user input selecting respective selection affordances of at least two of the plurality of discrete portions of the webpage; and
presenting a respective frequency affordance for each of the at least two discrete portions for independently setting a respective monitoring frequency for the discrete portion.

13. The electronic device of claim 8, wherein the one or more programs further comprise instructions for:
after presenting the indication of the updated content:
receiving an additional user input corresponding to a request to cache the webpage including the updated content; and
in response to receiving the additional user input, caching the webpage including the updated content.

14. The electronic device of claim 8, wherein the one or more programs further comprise instructions for:
while concurrently presenting at least the portion of the current summary information corresponding to the webpage and the update indicator, detecting a predefined user input for expanding the current summary information;
in response to receiving the predefined user input for expanding the current summary information, separately displaying respective numerical tallies of updates that have been made to a plurality of sub-blocks of the webpage.

15. A non-transitory computer readable storage medium storing one or more programs, the one or more programs comprising instructions, which, when executed by an electronic device with one or more processors, cause the electronic device to perform operations comprising:

receiving a user input corresponding to a request to monitor the webpage;

obtaining, in accordance with a predetermined monitoring frequency, current summary information corresponding to the webpage, wherein summary information comprises a summary of content included in the webpage;

determining whether the webpage includes updated content based on the current summary information corresponding to the webpage, including:

comparing the current summary information with previously obtained summary information corresponding to the webpage; and determining whether the webpage includes updated content based on the comparison between the current summary information and the previously obtained summary information corresponding to the webpage; and in accordance with a determination that the webpage includes updated content, presenting an indication of the updated content, including concurrently presenting at least a portion of the current summary information corresponding to the webpage and an update indicator that includes a numerical tally of updates that have been made to the webpage during a current monitoring period in accordance with the predetermined monitoring frequency or a numerical tally of items that have been updated in the webpage during the current monitoring period in accordance with the predetermined monitoring frequency.

16. The non-transitory computer readable storage medium of claim 15, wherein the instructions cause the electronic device to perform operations further comprising:

in response to receiving the user input corresponding to the request to monitor the webpage:

identifying a plurality of structurally discrete portions in the webpage by analyzing the webpage; and presenting in a widget a respective selection affordance for individually monitoring each of the plurality of structurally discrete portions of the webpage.

17. The non-transitory computer readable storage medium of claim 16, wherein the user input is a first user input and the instructions cause the electronic device to perform operations further comprising:

receiving a second user input corresponding to a request to monitor a respective portion of the plurality of portions of the webpage via the respective selection affordance of the respective portion; and in accordance with the second user input, starting individual monitoring of the respective portion of the webpage.

18. The non-transitory computer readable storage medium of claim 16, wherein the user input is a first user input and the instructions cause the electronic device to perform operations further comprising:

receiving a second user input selecting respective selection affordances of at least two of the plurality of discrete portions of the webpage; and presenting a respective frequency affordance for each of the at least two discrete portions for independently setting a respective monitoring frequency for the discrete portion.

19. The non-transitory computer readable storage medium of claim 16, wherein the user input is a first user input and the instructions cause the electronic device to perform operations further comprising:

while concurrently presenting at least the portion of the current summary information corresponding to the webpage and the update indicator, detecting a predefined user input for expanding the current summary information;

in response to receiving the predefined user input for expanding the current summary information, separately displaying respective numerical tallies of updates that have been made to a plurality of sub-blocks of the webpage.

20. The non-transitory computer readable storage medium of claim 15, wherein the instructions cause the electronic device to perform operations further comprising:

after presenting the indication of the updated content:

receiving an additional user input corresponding to a request to cache the webpage including the updated content; and in response to receiving the additional user input, caching the webpage including the updated content.

* * * * *